(12) United States Patent
Best

(10) Patent No.: US 7,445,549 B1
(45) Date of Patent: *Nov. 4, 2008

(54) NETWORKED PORTABLE AND CONSOLE GAME SYSTEMS

(76) Inventor: Robert M. Best, 5100 S. Cleveland Ave. suite 318 #325, Fort Myers, FL (US) 33907

( * ) Notice: Subject to any disclaimer, the term of this patent is extended or adjusted under 35 U.S.C. 154(b) by 851 days.

This patent is subject to a terminal disclaimer.

(21) Appl. No.: 10/870,648

(22) Filed: Jun. 17, 2004

Related U.S. Application Data

(63) Continuation-in-part of application No. 09/928,294, filed on Aug. 10, 2001, now abandoned, which is a continuation-in-part of application No. 09/853,487, filed on May 10, 2001, now Pat. No. 6,966,837, which is a continuation-in-part of application No. 10/668,940, filed on Sep. 22, 2003, now Pat. No. 7,326,117.

(51) Int. Cl.
*A63F 13/00* (2006.01)

(52) U.S. Cl. .............................. 463/32; 463/30; 463/31; 463/33; 463/34; 463/42

(58) Field of Classification Search ...................... 463/1, 463/30–34, 42
See application file for complete search history.

(56) References Cited

U.S. PATENT DOCUMENTS

| | | | |
|---|---|---|---|
| 4,302,011 A | 11/1981 | Pepper | |
| 4,542,903 A * | 9/1985 | Yokoi et al. | .................... 463/31 |
| D333,493 S | 2/1993 | Sato | |
| 5,184,830 A | 2/1993 | Okada et al. | |
| 5,393,073 A | 2/1995 | Best | |
| 5,428,528 A | 6/1995 | Takenouchi et al. | |
| 5,682,171 A | 10/1997 | Yokoi | |
| 5,952,998 A | 9/1999 | Clancy et al. | |
| 6,055,013 A | 4/2000 | Woodgate et al. | |
| 6,132,315 A | 10/2000 | Miyamoto et al. | |
| 6,139,433 A | 10/2000 | Miyamoto et al. | |
| 6,139,434 A | 10/2000 | Miyamoto et al. | |
| 6,163,313 A | 12/2000 | Aroyan et al. | |
| 6,238,291 B1 | 5/2001 | Fujimoto et al. | |
| 6,239,389 B1 * | 5/2001 | Allen et al. | ............... 178/18.01 |

(Continued)

FOREIGN PATENT DOCUMENTS

EP 0 976 429 A1 2/2000

(Continued)

OTHER PUBLICATIONS

PlayStation from Answers.com (http://www.answers.com/psone?cat=technology) No author identified, Document viewed Dec. 27, 2007.*

(Continued)

*Primary Examiner*—Robert E Pezzuto
*Assistant Examiner*—Robert Mosser
(74) *Attorney, Agent, or Firm*—Graybeal Jackson Haley LLP

(57) ABSTRACT

Video game systems for multiple-player games may exchange synchronizing data through the Internet or other data transmission link. These status data records keep the video game systems synchronized with each other whenever different players are trying to use the same virtual tunnel, cave, or other confined room with insufficient space for more than one player character at a time.

20 Claims, 34 Drawing Sheets

U.S. PATENT DOCUMENTS

| | | |
|---|---|---|
| 6,241,610 B1 | 6/2001 | Miyamoto et al. |
| 6,296,570 B1 | 10/2001 | Miyamoto et al. |
| 6,314,483 B1 | 11/2001 | Goto |
| 6,369,827 B1 | 4/2002 | Pan et al. |
| 6,437,777 B1 | 8/2002 | Kamachi et al. |
| 6,449,344 B1 | 9/2002 | Goldfinger et al. |
| 6,468,160 B2 | 10/2002 | Eliott |
| 6,478,679 B1 | 11/2002 | Himoto et al. |
| 6,500,070 B1 | 12/2002 | Tomizawa |
| 6,527,637 B2 | 3/2003 | Fujioka et al. |
| 6,539,421 B1 | 3/2003 | Appleman et al. |
| 6,544,126 B2 | 4/2003 | Sawano et al. |
| 6,561,909 B1 | 5/2003 | Iizuka |
| 6,570,563 B1 | 5/2003 | Honda |
| 6,579,184 B1 | 6/2003 | Tanskanen |
| 6,626,760 B1 | 9/2003 | Miyamoto et al. |
| 2002/0165028 A1 | 11/2002 | Miyamoto et al. |
| 2003/0050116 A1 | 3/2003 | Chen |
| 2003/0153373 A1 | 8/2003 | Squibbs |
| 2003/0220141 A1 | 11/2003 | Corrigan et al. |
| 2003/0220142 A1 | 11/2003 | Siegel |
| 2004/0012671 A1 | 1/2004 | Jones et al. |
| 2004/0023719 A1 | 2/2004 | Hussaini et al. |

FOREIGN PATENT DOCUMENTS

| | | |
|---|---|---|
| GB | 2353928 | 3/2001 |
| JP | 6285259 A | 11/1994 |

OTHER PUBLICATIONS

Playstation from Wikipedia.org (http://en.wikipedia.org/wiki/Playstation) No author identified, Document viewed Dec. 27, 2007.*

* cited by examiner

Fig. 27

| record format | time stamp | message serial number | session and game id | player id number | object id | X, Y, Z location coordinates | X, Y, Z velocity vector | movement |

| record format | time stamp | message serial number | session and game id | player id number | object id | ψ heading angle | rate of rotation | orientation |

| record format | time stamp | message serial number | session and game id | player id number | object id | θ pitch angle | ø roll angle | orientation |

| record format | time stamp | message serial number | session and game id | player id number | object id | object id | collision |

| record format | time stamp | message serial number | session and game id | player id number | object id | character swimming character flying character jumping |

| record format | time stamp | message serial number | session and game id | player id number | object id | attribute | value | current strength |

| record format | time stamp | message serial number | session and game id | player id number | object id | door id | go through door |

| record format | time stamp | message serial number | session and game id | player id number | compressed sound bite data | player's voice sound |

Fig. 29

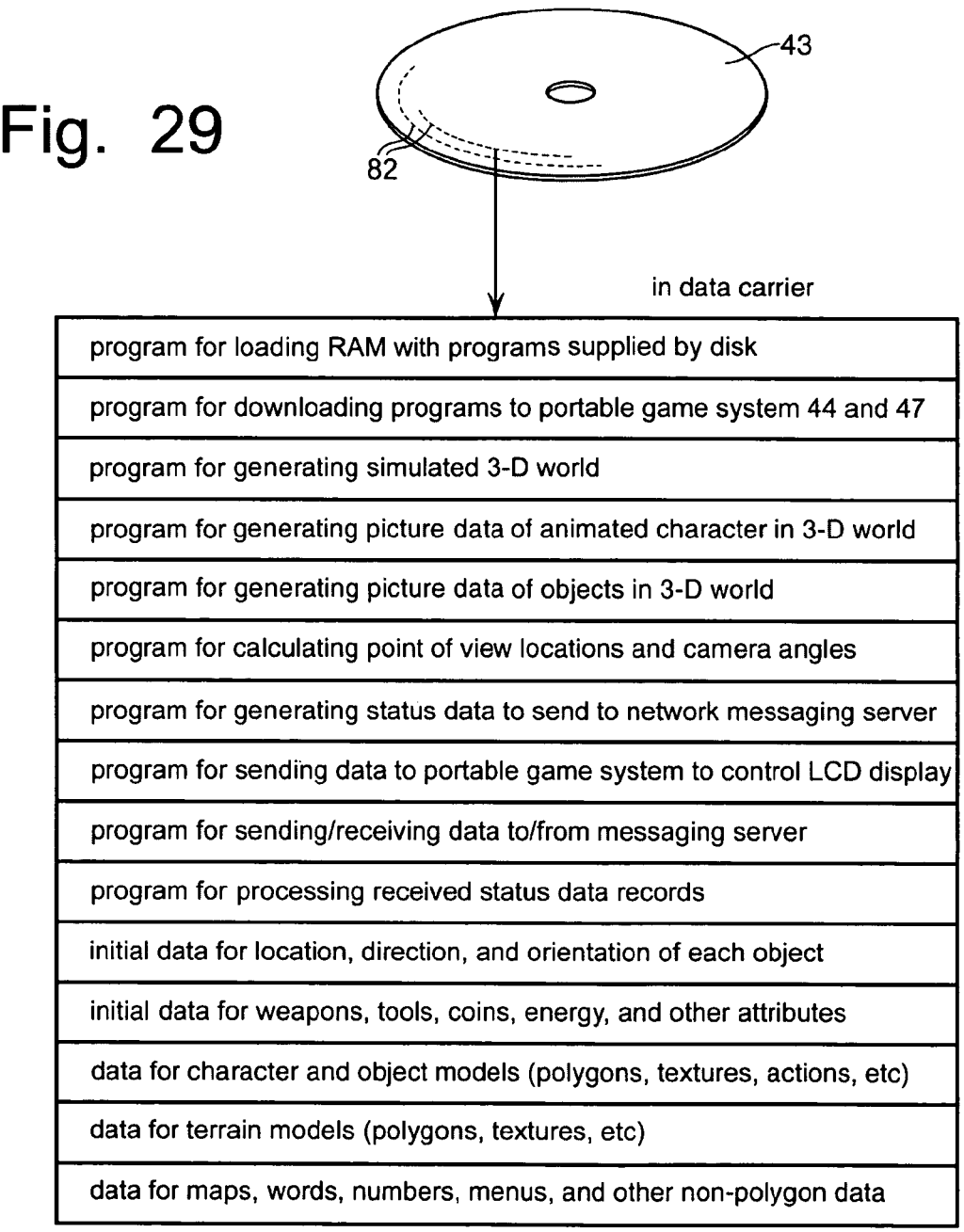

in data carrier

| |
|---|
| program for loading RAM with programs supplied by disk |
| program for downloading programs to portable game system 44 and 47 |
| program for generating simulated 3-D world |
| program for generating picture data of animated character in 3-D world |
| program for generating picture data of objects in 3-D world |
| program for calculating point of view locations and camera angles |
| program for generating status data to send to network messaging server |
| program for sending data to portable game system to control LCD display |
| program for sending/receiving data to/from messaging server |
| program for processing received status data records |
| initial data for location, direction, and orientation of each object |
| initial data for weapons, tools, coins, energy, and other attributes |
| data for character and object models (polygons, textures, actions, etc) |
| data for terrain models (polygons, textures, etc) |
| data for maps, words, numbers, menus, and other non-polygon data |

Fig. 30

RAM in portable system 53

| |
|---|
| program for converting finger movement into location coordinates |
| program for generating data representing 3D world |
| program for determining viewpoint and camera angle |
| program for generating movement of a 3D character in a 3D game world |
| program for generating commands for graphics processor |
| program for transferring data to/from an external system |
| program for displaying maps and other non-polygon data |
| programs transferred to/from an external system |
| data transferred to/from an external system |
| data coordinates of objects displayed on LCD 22 |
| data coordinates of objects displayed on LCD 33 |
| data for simulated 3-D world |
| data for player-controlled object |
| data for character and object models (polygons, textures, actions, etc) |
| data for terrain models (polygons, textures, etc) |
| data for maps, words, numbers, menus, and other non-polygon data |

NETWORKED PORTABLE AND CONSOLE GAME SYSTEMS

CROSS-REFERENCE TO RELATED APPLICATIONS

This application is a continuation-in-part of U.S. patent application Ser. No. 09/928,294 filed Aug. 10, 2001 abandoned, which is a continuation-in-part of U.S. patent application Ser. No. 09/853,487 filed May 10, 2001, now U.S. Pat. No. 6,966,837. This application is also a continuation-in-part of U.S. application Ser. No. 10/668,940 filed Sep. 22, 2003, now U.S. Pat. No. 7,326,117. The contents of these applications in their entirety are incorporated herein by reference.

FIELD OF THE INVENTION

This invention relates generally to electronic game systems and more particularly to game systems that have touch screens, liquid-crystal display (LCD) screens, and Internet data transmission.

BACKGROUND

Discussion of Prior Art

Video game console systems, handheld control units, and handheld electronic games having liquid crystal display (LCD) screens are well known and are described in U.S. Pat. No. 5,393,073. It is also known to use touch-sensitive screens and touchpads for entering information into handheld computers. It is also known for game players to operate handheld controllers to control movement of player controlled characters in simulated 3-dimensional space as described in U.S. Pat. No. 6,139,433.

In a video game in which two or more human players control their respective player-controlled characters on a TV-screen using handheld controllers with LCD screens (see my U.S. Pat. No. 5,358,259), a problem arises as to how each human player can signal to the game console (the game system's main computer) what the player wants his/her character to do, other than using push buttons and joysticks to control simple actions such as running, jumping, hitting, shooting, etc. In a multi-player games played over the Internet, there is an additional problem of how to keep each of the individual game worlds in synch so that each player character faces the same updated game world as other characters.

Patent application GB 2,353,928A discloses a game system having a console connected to multiple handheld game machines with LCD's that display maps including squares to indicate player-controlled characters, circles to indicate monsters, and diamonds to indicate items. Although this patent application maintains that these maps are pictures, the patent application does not provide any examples of pictures of animated characters with hands, arms, legs, faces, and clothing for display on portable game systems used as control units.

Therefore, a need has arisen for handheld controllers that display more natural visual information such as pictures, especially pictures of characters, that enable players to control their player characters more naturally than with prior-art controllers.

SUMMARY OF THE INVENTION

An embodiment of this invention is a video game system that includes a console unit and portable game systems used as handheld control units. The console unit generates animated pictures for display on a television (TV) screen or console LCD monitor. The console monitor preferably has autostereoscopic features (which require no head-mounted display). Handheld control units are of two kinds: portable game systems that include LCD screens that display pictures, maps, words, numbers, etc, and conventional controllers that do not include LCD screens. Players may use both kinds of peripheral units at the same time.

During parts of the game, each control unit may directly control animated player-controlled characters that are displayed on the TV screen or console monitor, and on LCD screens in portable game systems that display pictures of scenes and animated characters that are different from the scenes and characters displayed on the console monitor or monitors. Each portable game system may operate for awhile as an independent game system while remaining in wireless communication with the console game unit that may be generating pictures of the same scene or a different scene for display on the monitor. Pictures displayed on a portable game system LCD screen may appear concurrently or later on a TV screen or monitor.

Simulated objects and characters are displayed on the LCD screen of a portable game system in a natural pictorial setting, to the degree that it is possible to make pictures look natural on a small LCD screen, and can be selected, moved, constructed, changed, or deleted by a player using a touchscreen or other control devices on the portable game system, without revealing to other players the simulated objects or their disposition.

In the preferred embodiment, each player uses a handheld controller that has one or more joysticks for controlling player-controlled characters in a simulated 3-dimensional world, and a portable game system that has an LCD screen and a touchscreen so that players can view pictorial information that is hidden from other players and select and control objects, characters, actions, and tasks on one LCD screen while entering data on the touchscreen. The game system in general will provide a unified game experience in which a combination of controller and portable game system with touchscreen will do more than just control a console game, but also do more than just a stand-alone portable game system.

Each game system generates a simulated game world populated with animated characters and static objects which are displayed on the monitor screen and also displayed on portable game systems with one or two LCD screens. While one part of the simulated game world is displayed on the monitor, different parts of the simulated world may appear on LCD screens while each player uses a handheld controller to control one or more player-controlled characters on the monitor or LCD screens or both. Some of the pictures displayed on LCD screens and monitor may represent the same area of the simulated world at different times, or different parts at the same time, or the same part at the same time.

In a war game for example, while a first player is controlling a soldier fighting a skirmish in one part of the simulated world that appears on the first player's LCD screen, a second player may be controlling a different character building a fortification in a different part of the simulated world and this building scene appears on the second player's LCD screen, while a third part of the simulated world may appear on a monitor in this example. Later, the fortification that was built by the second player's character may appear on the first player's LCD screen or monitor.

If the two players are distantly separated and their portable game systems or consoles communicate through a local area network or through the Internet, the second player's building scene may appear on the first player's LCD or monitor and the first player's skirmish scene may appear on the second player's LCD or monitor. Multiple players may display different areas of a common game world that each of the players are influencing through their respective player-controlled characters.

ADVANTAGES

By displaying pictures on an LCD screen for each player, alternative dispositions of objects and characters in the game are presented to players in a natural setting, unlike menus of words or symbols representing characters. Game world pictures displayed on handheld LCD screens will provide quicker and more accurate recognition when using an attached touchscreen to select and move locations, directions, orientation, and actions of game characters before they appear on a TV screen or monitor.

OBJECTIVES

An object of this invention is to make strategy and role-playing video games more fun for players by providing alternative choices for each player in personalized natural pictures on portable game systems linked to each other and to console systems that are also linked to each other.

BRIEF DESCRIPTION OF THE DRAWINGS

FIG. 27 are typical record formats of status records that may be transmitted to and received from interacting game systems.

FIG. 29 is a typical memory map of programs and data stored on a data carrier such as an optically coded disk.

FIG. 30 is a typical memory map of programs and data stored in RAM 53 in each portable game system.

DETAILED DESCRIPTION OF EXEMPLARY EMBODIMENTS

Figure 1:
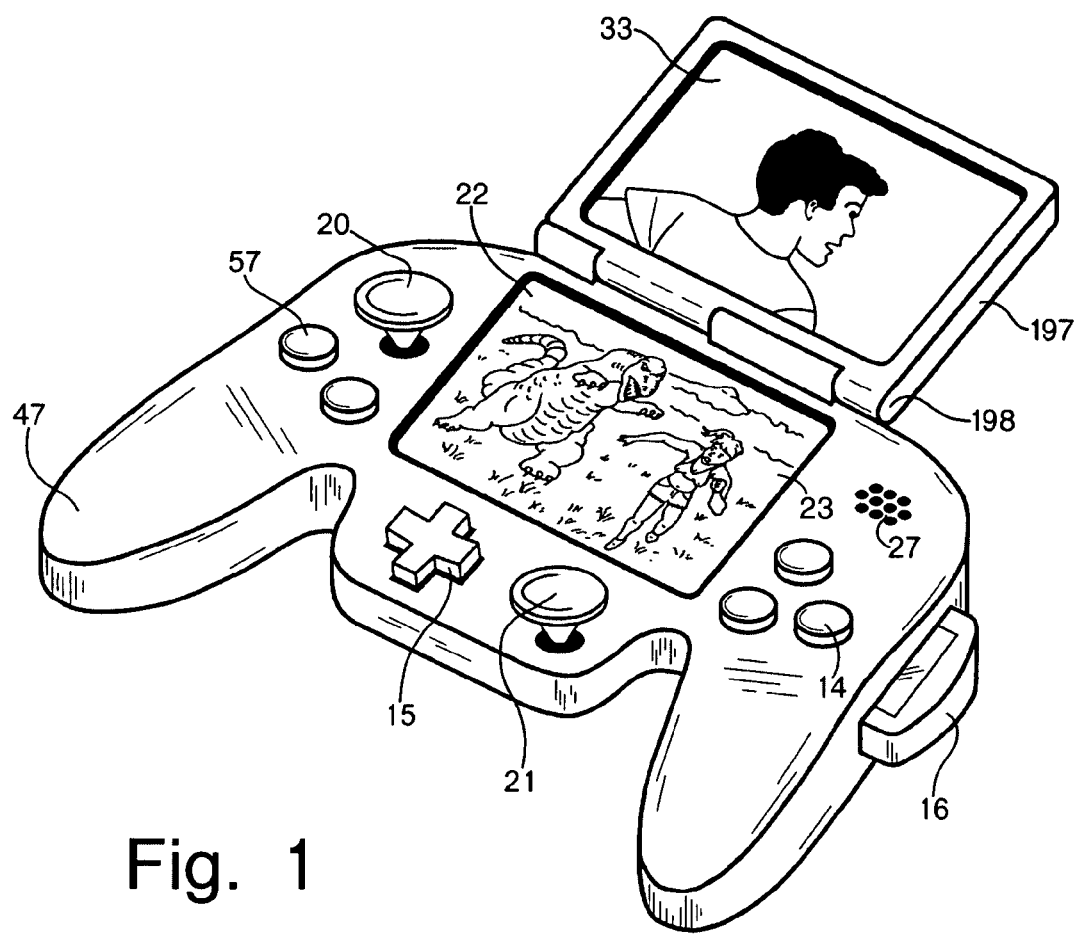
FIG. 1 illustrates a portable game system containing a touchscreen LCD and a second LCD screen.
Figure 2:
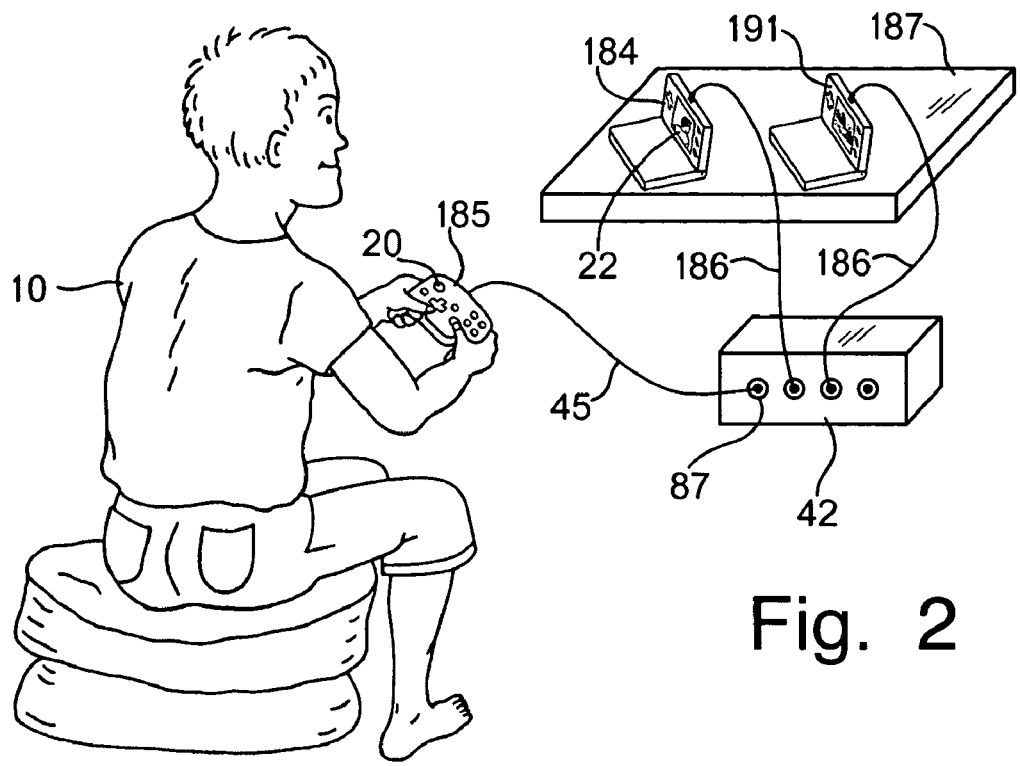
FIG. 2 illustrates a game playing session in which a human game player operates a handheld controller while viewing two LCD screens connected through a console system.
Figure 2A:
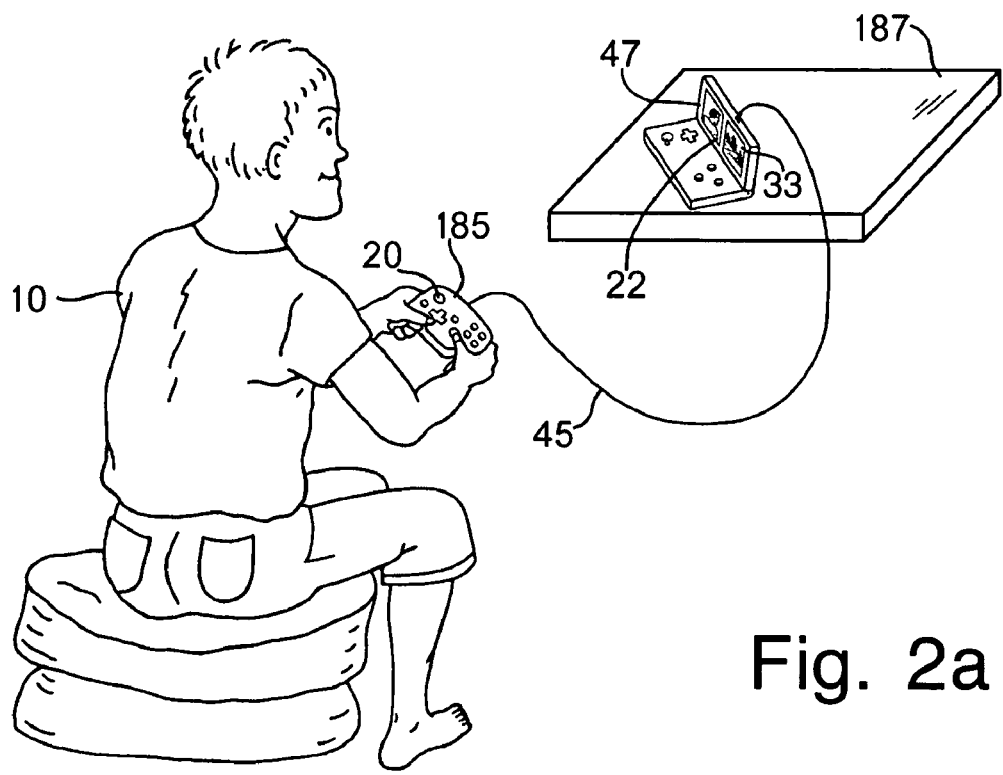
FIG. 2a illustrates a game playing session in which a human game player operates a handheld controller while viewing two LCD screens connected by a wire cable.

FIG. 1 illustrates a portable game system 47 which overcomes some of the difficulties a player might have when selecting actions and moving objects on an LCD screen using only cross-switch 15 and push-buttons 14 and 57 on the handheld control units 185 illustrated in FIGS. 2 and 2a. The exemplary FIG. 1 game system includes cross-switch 15, two analog joysticks 20 and 21, push-buttons 57, 14 and other buttons, speaker 27, external memory cartridge 16, and LCD 22 covered with transparent touchscreen 23 (shown in FIGS. 10, 11, 12, and 16).

Figure 10:
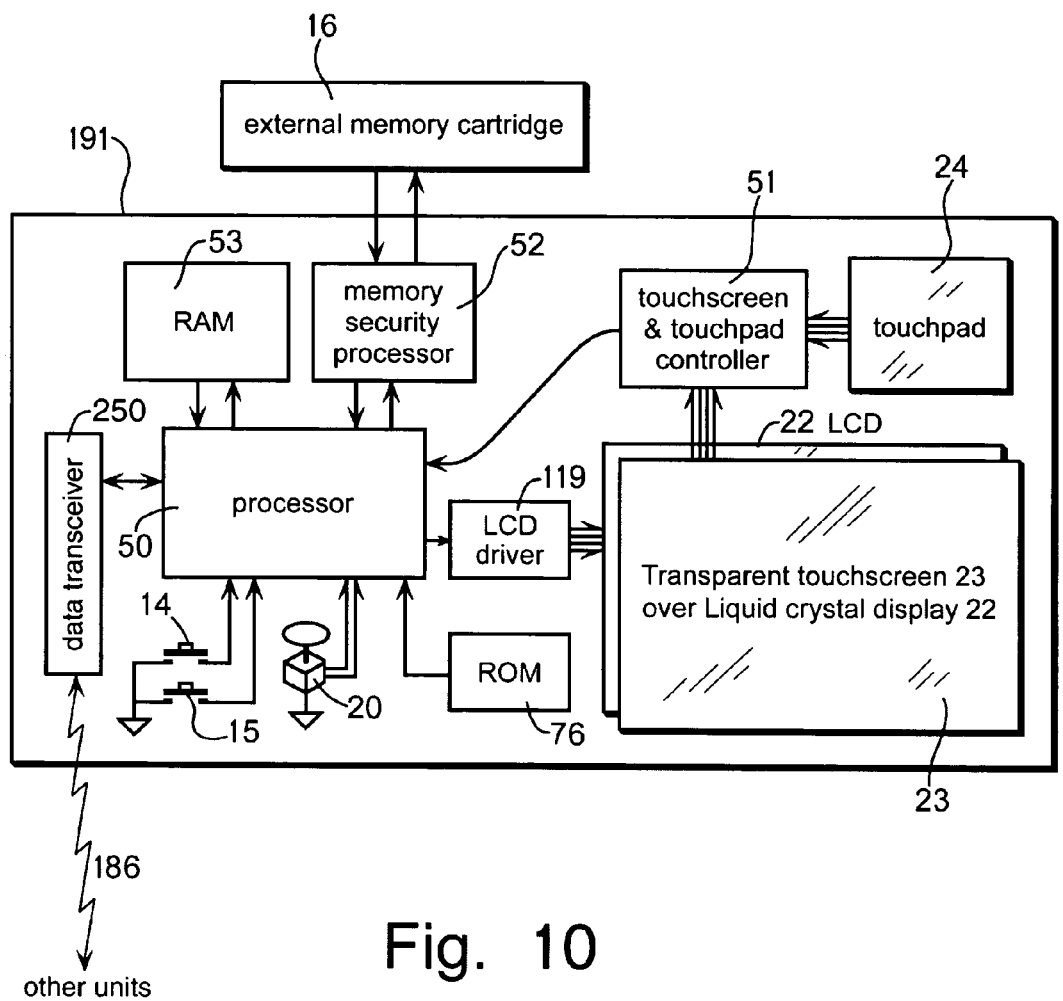
FIG. 10 is a block diagram of a FIG. 1 portable game system that has a touchscreen LCD but lacks a second LCD.
Figure 18:
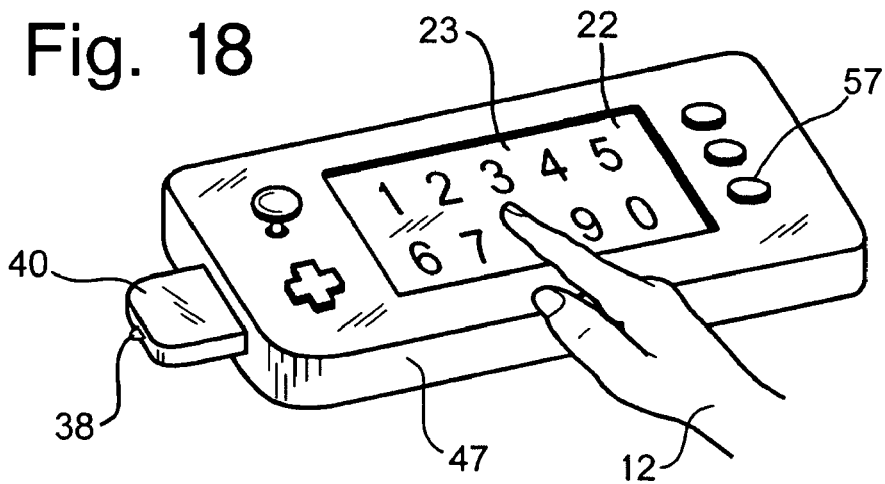
FIG. 18 is a perspective view of a portable game system with an LCD touchscreen illustrating manual data entry of alphanumeric characters.

Touchscreen 23 is sensitive to finger touch and/or pressure and can sense the approximate location of a finger or stylus on X-Y coordinates on LCD 22 as described below with reference to FIG. 19. Transparent touchscreen technology is described in U.S. Pat. No. 6,163,313. In FIG. 1 herein, touchscreen 23 is specified for portable game system 47 so that a player can use fingers of both hands to maneuver virtual objects in 3-dimensional space on LCD screen 22. A player can select an object on touchscreen 23 with one finger, and while holding his finger steadily on the object, use another finger on joystick 21 to rotate the object into the desired position. Touchscreen 23 can also act as push-buttons by accepting a finger or stylus tap, for example, of a few hundred milliseconds as illustrated in FIGS. 18-18c. A block diagram of portable game system 47 with one LCD device is illustrated in FIG. 10.

FIG. 2 illustrates an exemplary game playing session in which human game player 10 manipulates control members on control unit 185 while viewing pictures, maps, and other visual images displayed on two or more LCD screens 22 on portable game systems 184 and 191. These units are digitally connected by cable, wireless, or other data transmission means to console game system 42 which transfers control data to portable game systems 184 and 191 which generate images of game characters and other images for display. Player 10 controls movement of a player character on LCD 22 in a simulated three-dimensional world generated by portable game systems 184 and 191. Player 10 further manipulates control members on control unit 185 to select alternative views of the simulated world for display on LCD 22 in units 184 or 191 or both.

By having two or more LCD display devices 22 each showing different locations in the simulated world and viewed from different angles, the player can select and monitor trouble areas in the simulated world similar to a security guard monitoring closed-circuit television pictures from security cameras. A program in console 42 may cycle through several views selected by player 10 for display in succession on one or more LCD screen 22. A map of one part of the simulated world may be displayed on one LCD 22, while a picture of a portion of the simulated world is displayed on another LCD. Portable game systems 184 and 191 may be supported by a table, desk, or shelf 187.

In FIG. 2a, player 10 manipulates control members on control unit 185 while viewing pictures, maps, and other visual images displayed on two LCD screens 22 and 33 on portable game system 47.

Figure 3:
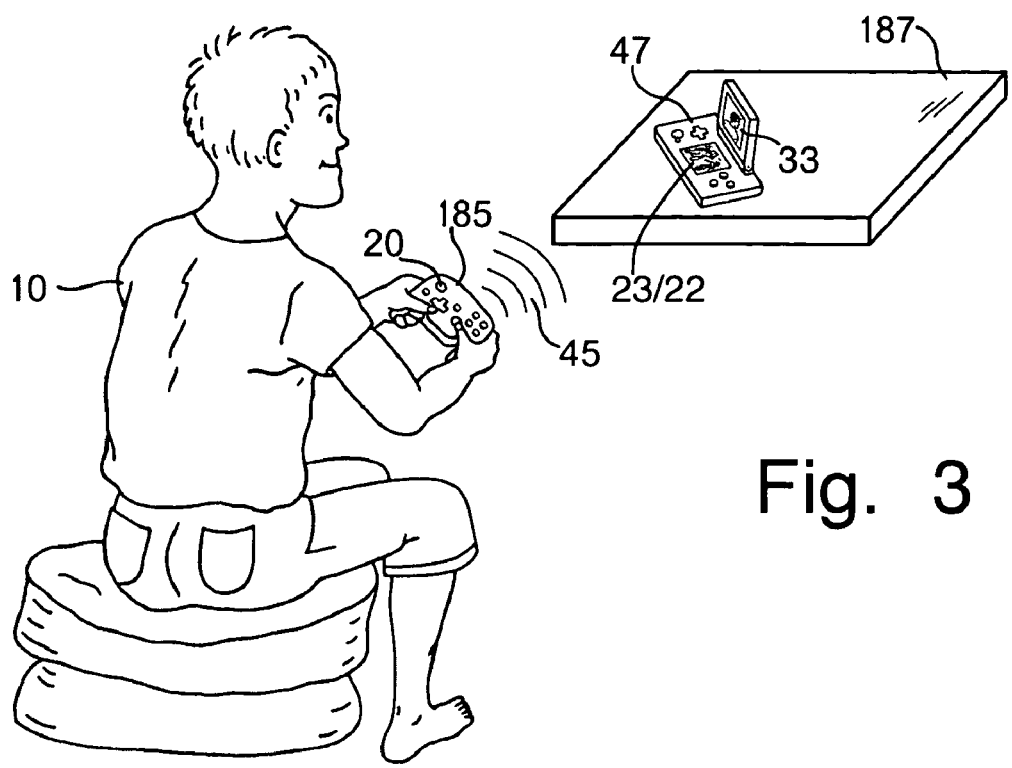
FIG. 3 illustrates a game playing session in which a human game player operates a wireless handheld controller while viewing two LCD screens.

FIG. 3 illustrates an exemplary game playing session in which human game player 10 manipulates control members on control unit 185 which is wirelessly connected to portable game system 47 that has an LCD screen 33 and a touchscreen 23 attached to LCD 22. Player 10 views pictures, maps, and other visual images displayed on both LCD screens 22 and 33 and may enter data onto touchscreen 23 with his finger or handheld stylus while holding controller 185 in his other hand.

Figure 3A:
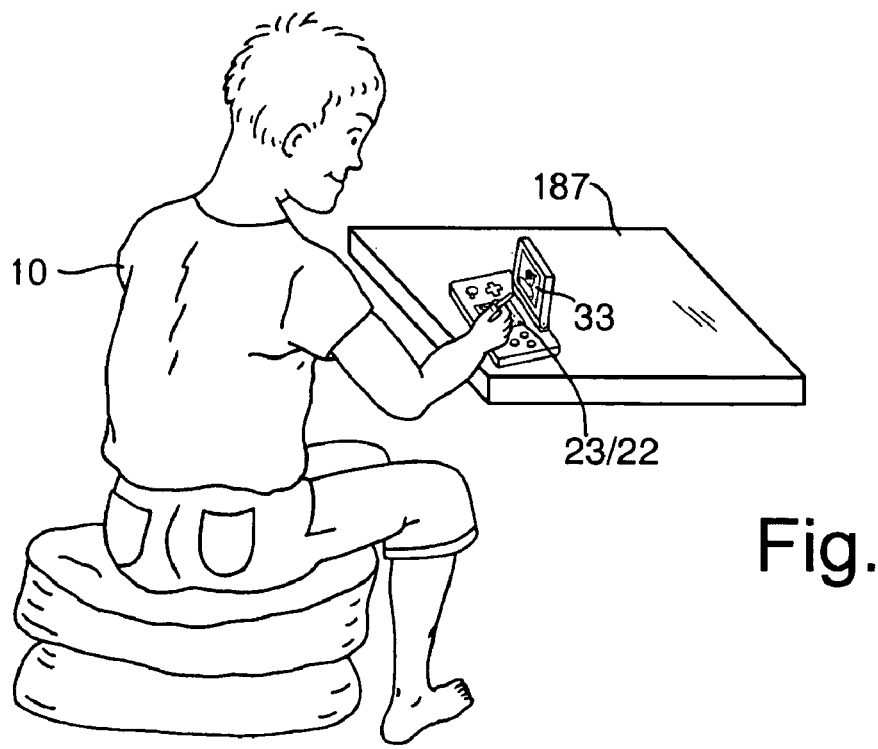
FIG. 3a illustrates a game playing session in which a human game player operates a stylus on a touchscreen in a portable game system that has two LCD screens.

In FIG. 3a, illustrates an exemplary game playing session in which player 10 enters data onto touchscreen 23 with his finger or handheld stylus while viewing pictures, maps, and other visual images displayed on LCD screens 22 and 33.

Figure 4:
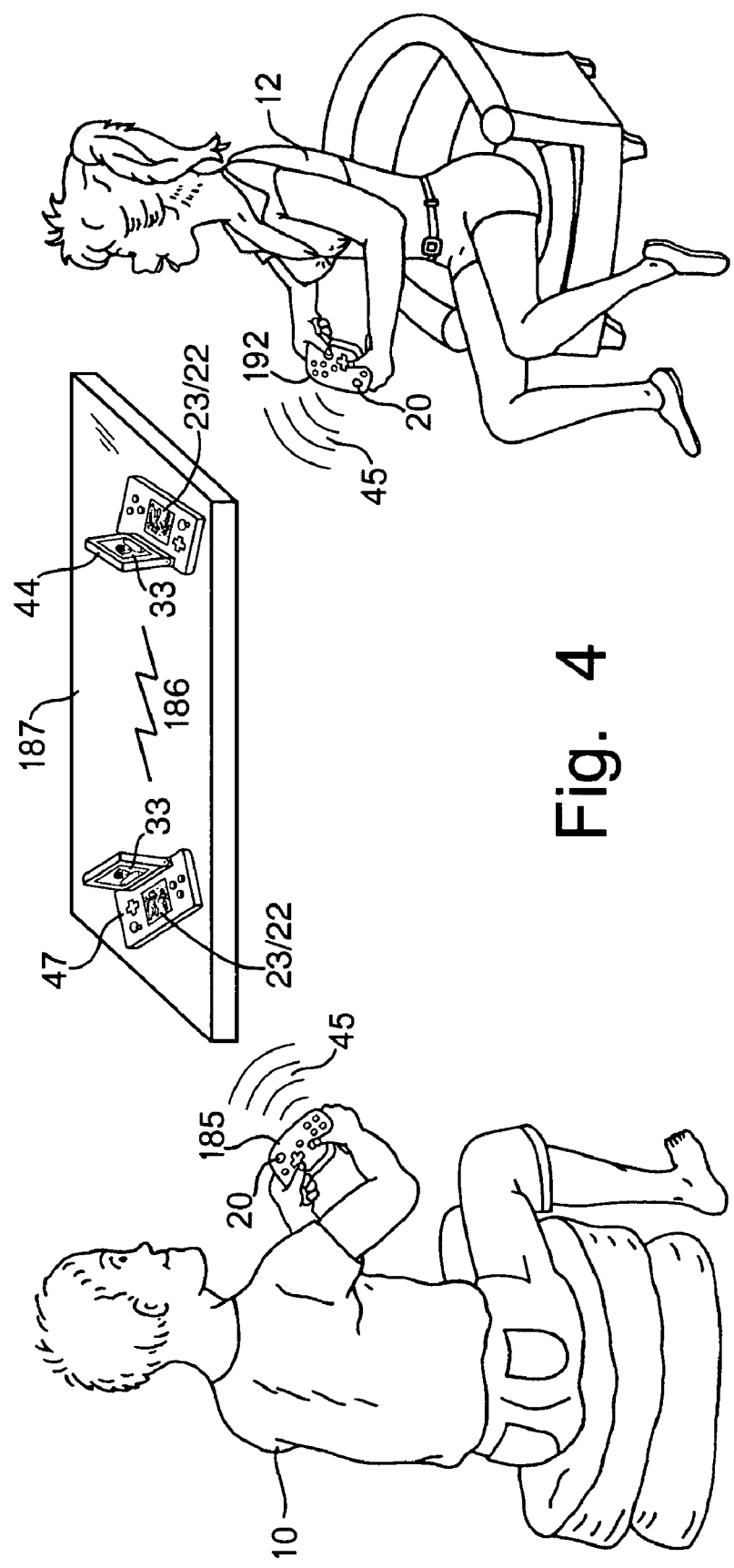
FIG. 4 illustrates a game playing session in which two human game players control two linked portable game systems that have touchscreens and two LCD screens.

FIG. 4 illustrates an exemplary game playing session in which two human game players 10 and 12 play a multiple-player game which is displayed on two or more portable game systems 47 and 44 which are wirelessly data linked to each other. Each portable game system 47 and 44 has a touchscreen 23 for manually controlling movement of 3-D objects in simulated 3-D worlds that are viewed from different viewpoints, directions, and angles on two LCD screens 22 and 33 in each portable game system.

Players may also use separate handheld control units 185 and 192 which are wirelessly linked to their respective portable game systems 47 and 44. Control units 185 and 192 each have one or more joysticks 20 and/or touchpads that control player-controlled characters in a simulated three-dimensional world displayed on LCD 22 or 33. Control units 185 and 192 control portable game systems 47 and 44 by wireless bi-directional data transmission 45.

Portable game systems 47 and 44 may be placed on a table 187 or other support within easy reach and viewing, so that each player's hands may operate controllers 185 and 192. Images on each LCD screen are hidden from other players by the respective housing of portable game systems 47 and 44.

Portable game systems 47 and 44 are linked in FIG. 4 by wireless bi-directional data transmission link 186 through which status data records are exchanged to synchronize the two systems so that different views of the same location in the same simulated 3-D world will include the same moving 3-D objects performing the same actions at the same time. Any changes made to the 3-D game world generated by one system as a result of player control will also be made to the 3-D game world generated by the other system and vice versa. In this example, portable game system 47 transmits data to portable game system 44 and portable game system 47 transmits data to portable game system 47. Some of this transmitted data identifies any changes of status in the simulated game world such as a door opening, a character entering a passageway, the current location and orientation of each character, objects acquired or lost or consumed, and other status data described below with reference to FIG. 27.

Control members on control units 185 and 192 such as joystick 20 and touchscreen 23 controls generation of images displayed on LCD screens 22 and 33. These images may include three-dimensional movements of three-dimensional characters in three-dimensional game worlds and other visual information on LCD screen 22 of portable game systems 47 and 44.

Figure 5:
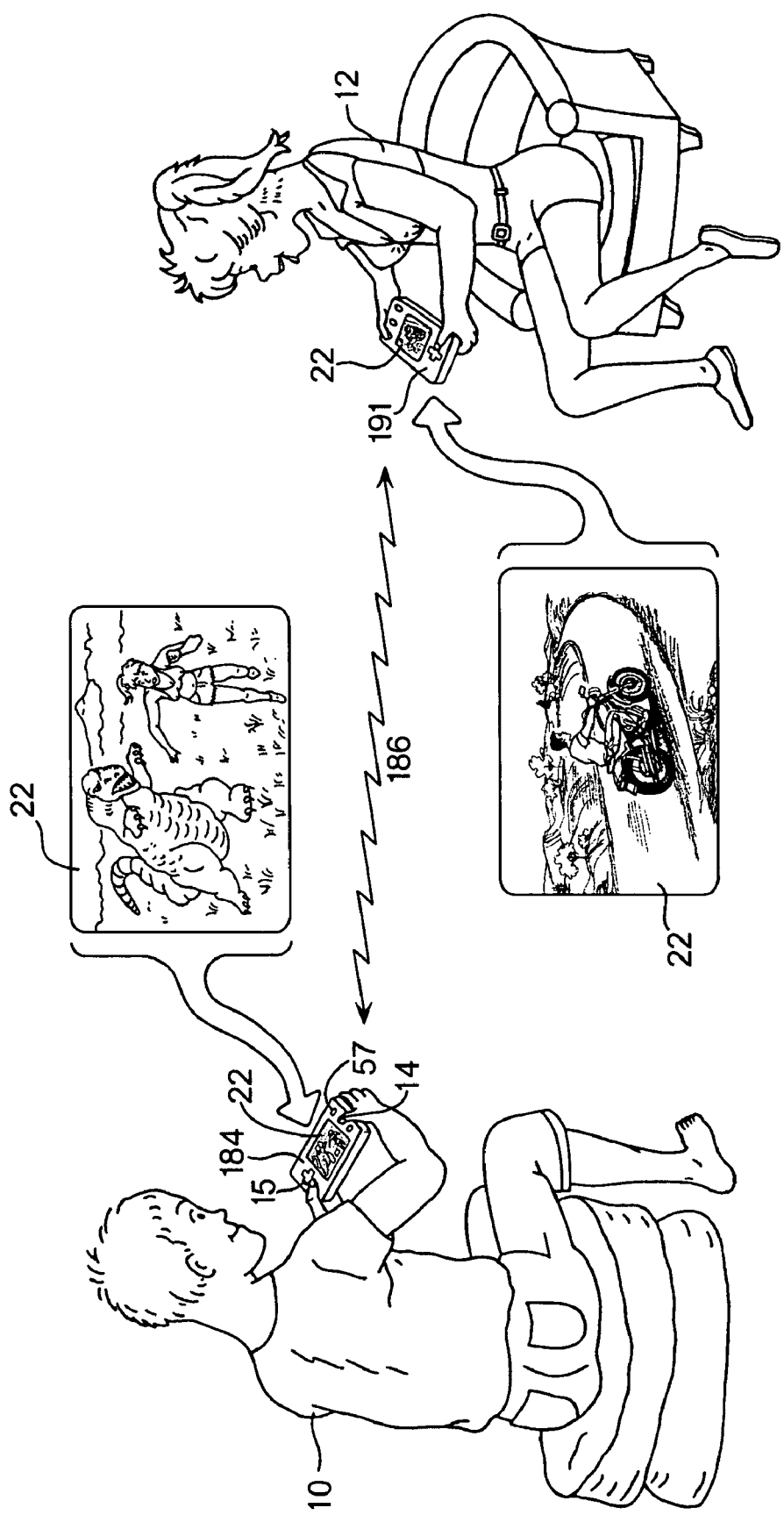
FIG. 5 illustrates a game playing session in which two human game players control portable game systems that are linked by wireless transmission.

FIG. 5 illustrates an exemplary game playing session in which two human game players 10 and 12 use portable game systems 184 and 191 which are wirelessly linked to each other through data transmission link 186. Portable game systems 184 and 191 are lacking touchscreens and second LCD displays, but would otherwise operate the same as portable game systems 47 and 44 described above with reference to FIG. 4.

Figure 6:
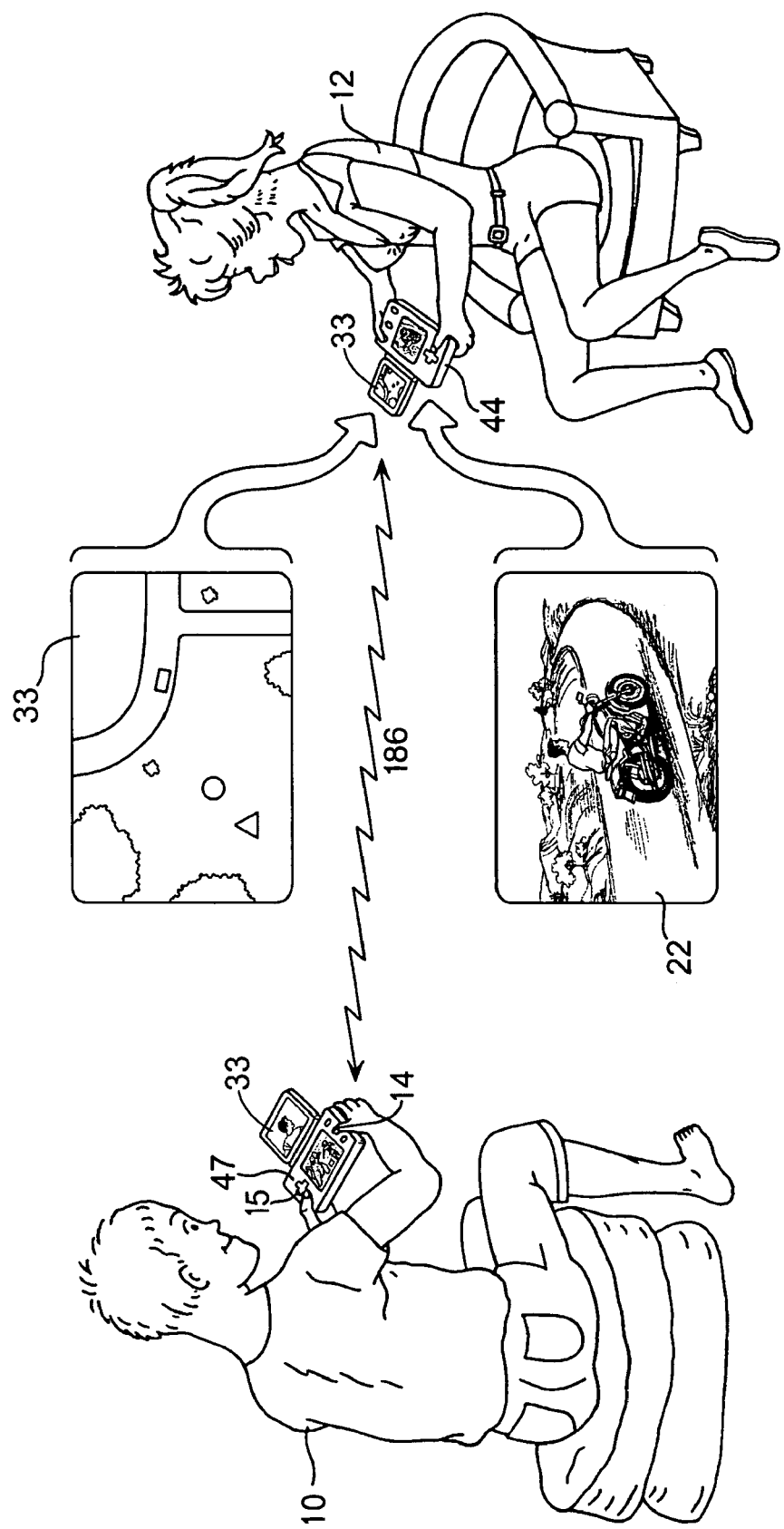
FIG. 6 illustrates a game playing session in which two human game players control portable game systems that are linked by wireless and have two LCD screens each.

FIG. 6 illustrates an exemplary game playing session in which two human game players 10 and 12 use portable game systems 47 and 44 which are wirelessly linked to each other through data transmission link 186. Portable game systems 47 and 44 contain touchscreens and second LCD displays 33 and operate the same as portable game systems 47 and 44 described above with reference to FIG. 4 except that the portable game systems are operated as handheld systems and do not require the additional handheld controllers 185 and 192 in FIG. 4.

Figure 7:
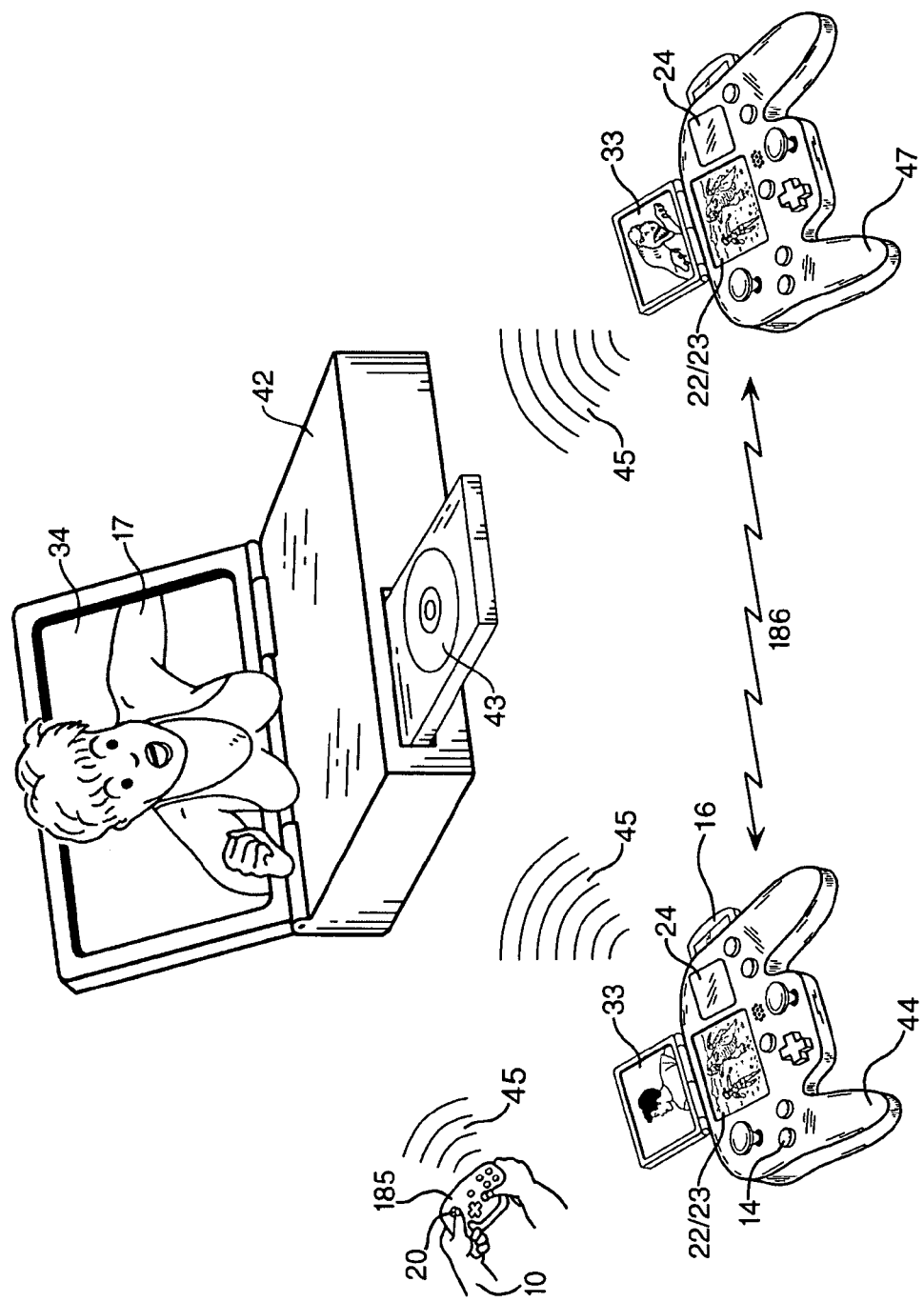
FIG. 7 is a perspective view of an exemplary console game system with wireless links to two FIG. 1 portable game systems that have two LCD screens each.

FIG. 7 illustrates an exemplary embodiment of a game system which comprises console game system 42 and one or more portable game systems 44 and 47. The three systems 42, 44, and 47 exchange data through wireless bi-directional data transmission links 45 and 186 using RF radiation, or wire cable, or other equivalents (not shown in FIG. 7) such as infrared, ultrasonic, or other data communicating forms of energy. The zig-zag line symbol 186 and the concentric arcs symbol 45 both represent wireless bi-directional links and are equivalent symbols. Conventional handheld control unit 185 may also control the console game system 42 and/or portable game systems 44 and 47.

Figure 13:
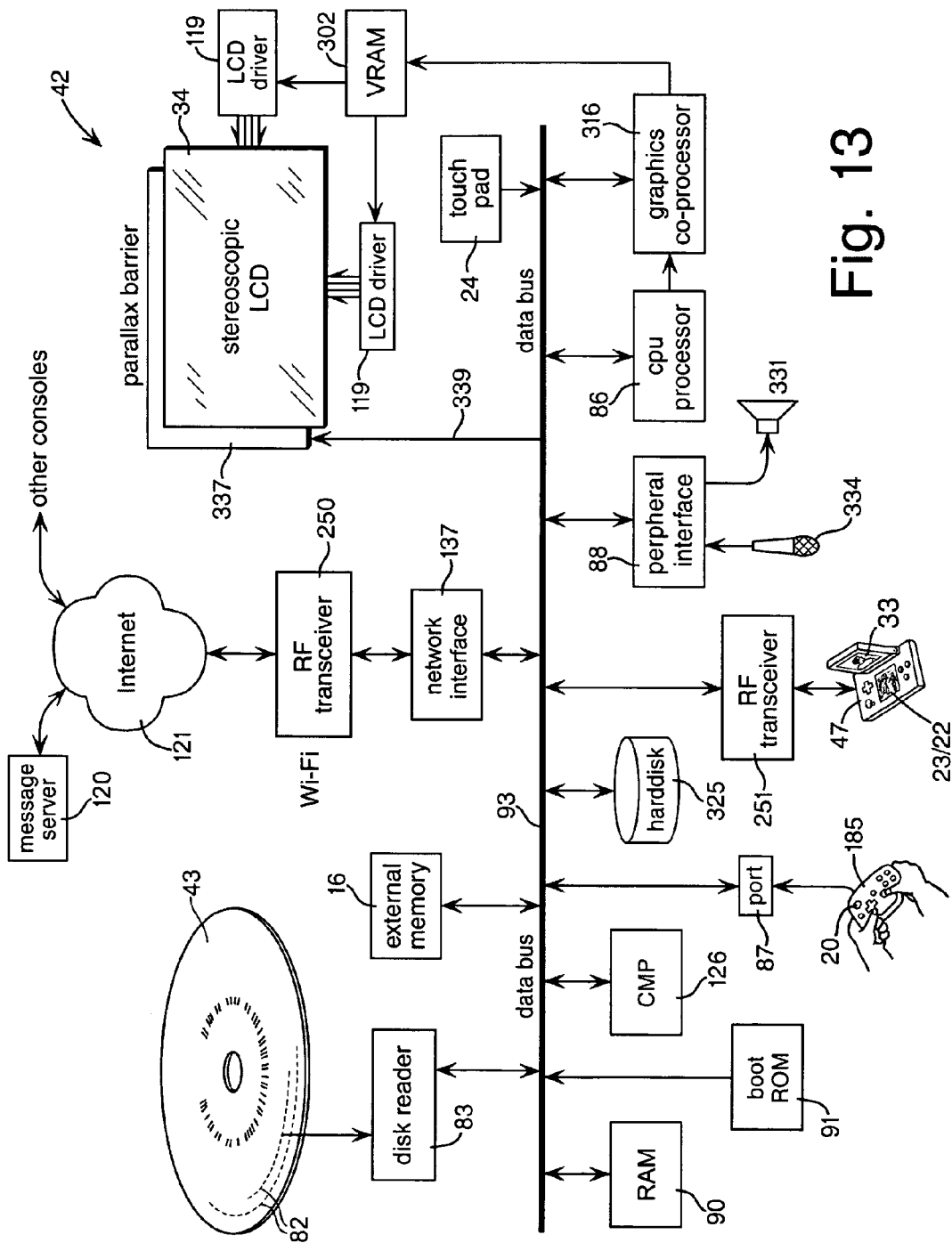
FIG. 13 is a block diagram of a console game system with an autostereoscopic LCD monitor and is linked to a portable game system and an Internet message server.
Figure 14:
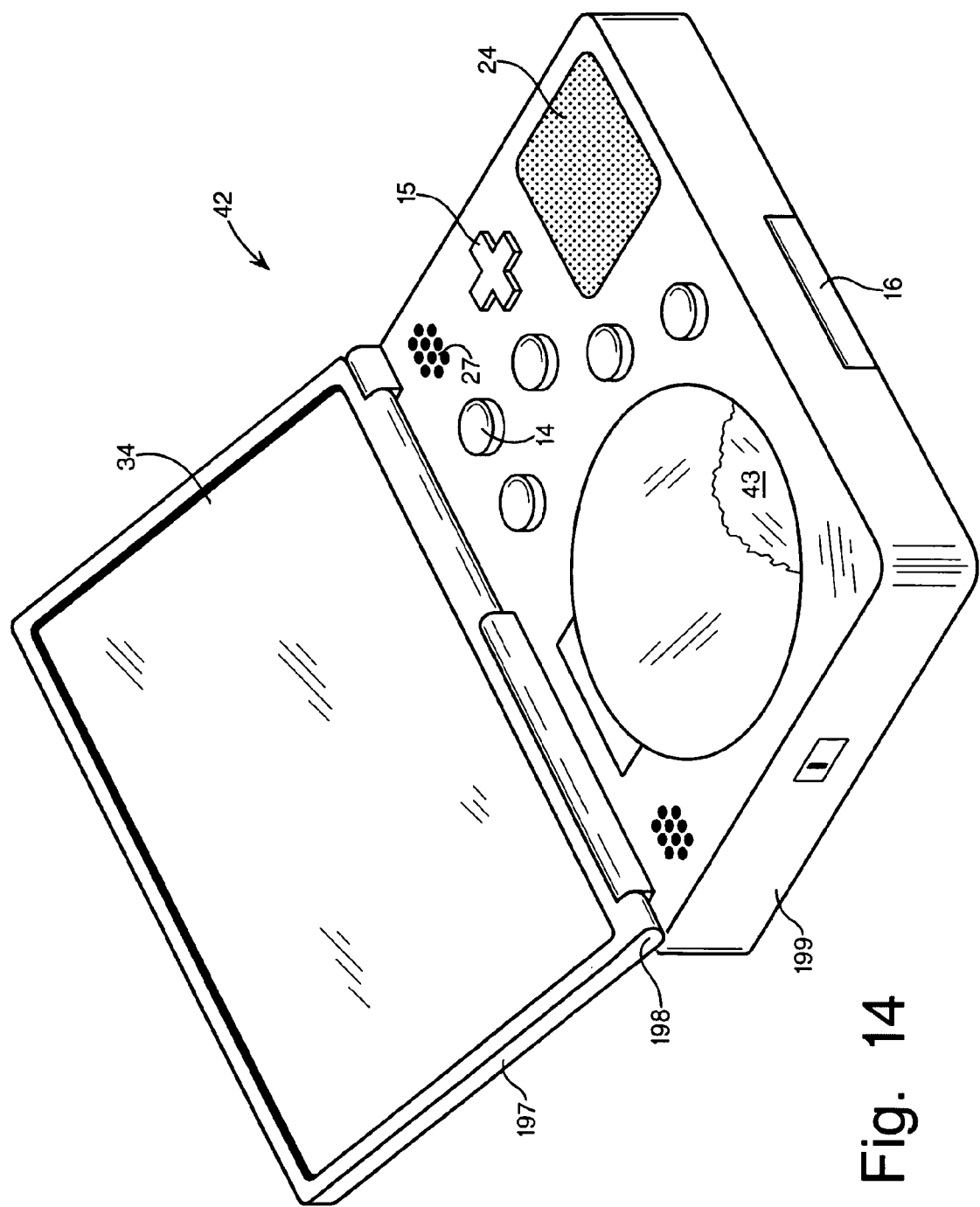
FIG. 14 is a perspective view of a console game system with builtin LCD monitor.

Console 42 is detailed in FIG. 13 which shows an optical disk reader 83 for reading optical disks 43 in which tracks of digital information, including game programs and data, are pressed by a disk manufacturer. A perspective view of one embodiment of console game system 42 that has an attached LCD monitor 34 is illustrated in FIG. 14. Other embodiments may use TV (FIGS. 16 and 17) display screen 56 rather than attached LCD monitor 34 in FIG. 14.

As illustrated in FIG. 7, console game system 42 comprises LCD screen 34 which is attached by hinges to a base that would typically be supported by a table or desk (not shown in FIG. 7) during use. In the preferred embodiment, LCD screen 34 displays autostereoscopic images to provide human game players with an illusion of binocular depth.

Figure 8:
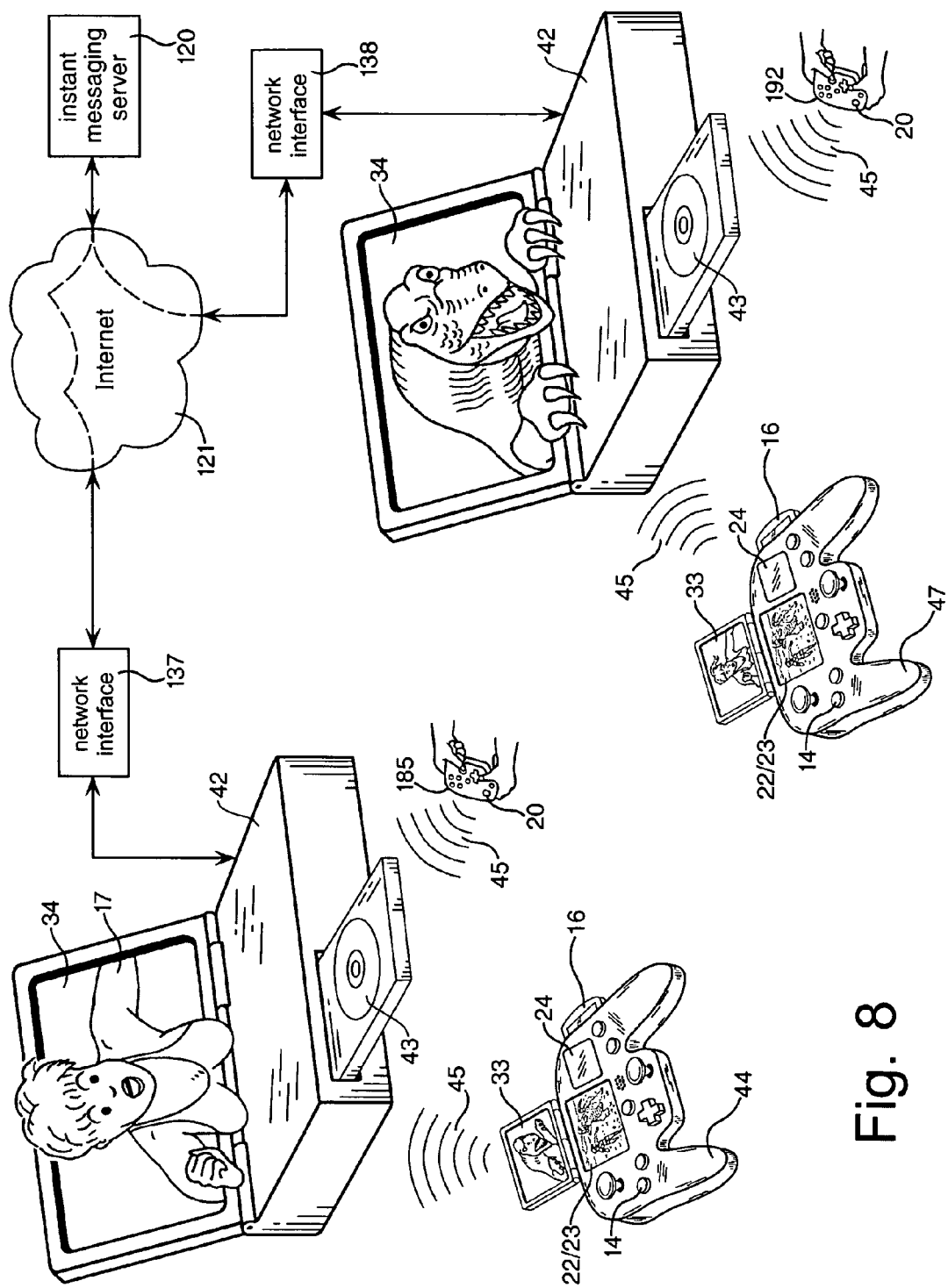
FIG. 8 is a perspective view of two Internet-linked console game system with wireless links to a FIG. 1 portable game system.

FIG. 8 illustrates an embodiment of a game system which comprises two or more console game systems 42 that exchange data through the Internet 121 and through instant messaging server 120. Each console game system 42 is described below with reference to FIG. 13 and is wirelessly linked to a portable game system 44 or 47 that has a touchscreen 23 attached to an LCD 22 as described below with reference to FIG. 11. Optionally, one or both console game systems 42 may have an autostereoscopic monitor 34 as depicted in FIG. 14 and is described below with reference to FIGS. 32, 33, and 34.

Each console game system 42 is manually controlled by a handheld controller 185 or by a portable game system 44 or 47 being operated as a controller and as an auxiliary display device, in this example. Each game player controls a different player character in the same multi-player game, typically a role playing game (RPG) shared by a small group of players during a game session. Each player in the group has a console game system 42 (only two are shown in FIG. 8) linked to the Internet 121.

All of the console game systems 42 used by each group of players execute the same game software during a game session which generate the same game worlds and objects, in this example. The same group of players may use other game titles during different sessions. Other groups of players may be using different game software titles simultaneously in separate sessions.

Each of the console game systems 42 transmit status data records 78 (see FIG. 27) through the Internet 121 or other communications network to a messaging server 120 which forwards the status data records 78 to other console game systems 42 in each session.

Messaging server 120 operates like a prior-art instant messaging server that shares each natual language message with several friends in each "buddy list" as described in U.S. Pat. No. 6,539,421, except that in the FIG. 27 examples, status data records 78 contain mostly digital codes and numbers that need not be readable by game players and hence would typically not be displayed as natual language instant messages. Status data records 78 are sent to the other console game systems 42 to be processed in each session to keep the systems synchronized so that each console game system 42 can accurately display any character or object in a simulated game world from variable points of view at any time during each session.

Each console monitor 34 displays a player character as usual, but other characters, objects, maps, scores, etc. are also displayed on portable game systems 44 and 47, in this example.

Each console game system 42 in this example has a network interface unit 137 or 138 that may be a wireless router connected to a broadband Internet Service Provider (ISP) cable, a wireless Access Point (AP) provided by a retail business, hotel, or apartment building owner, or a player's PC that has broadband access or a modem and tone generator for dialing telephone numbers to access messaging server 120, typically through a dialup Internet Service Provider. The network interface unit 137 or 138 would typically provide IP numbers and account numbers for accessing messaging server 120.

Each status data record 78 sent to the other console game systems 42 in a session may pass through messaging server 120. Alternatively, messaging server 120 may determine the current network (IP) address of each console game system 42 when systems 42 are connected to server 120 and then transmit a set of IP address records (see FIG. 28) to each system 42 in a session. Then each system 42 may send and receive status data records 78 as packets through the Internet or other network using data transmission protocols such as TCP/IP, so that most of the data records 78 need not be stored and forwarded through server 120.

In the FIG. 8 system, players can see each other's player characters or other objects on their respective portable game systems 44 and 47 or console monitors. The player holding controller 192 sees the dinosaur on console monitor 34 in this example. The dinosaur is also displayed on LCD screen 33 of portable game system 44 operated by the other player with controller 185. Likewise, the player holding controller 185 sees her player character 17, the woman displayed on console monitor 34, and this character 17 is also displayed on the other player's LCD 33 in portable game system 47. Each player can choose to view other objects in the game world besides what the other player sees, but this example illustrates how players can share a common experience, even though separated by thousands of miles, as if they were playing in the same living room watching the same TV screen.

Each portable game system 44 and 47 in FIG. 8 is operated as an auxiliary display linked to a console game system 42 by wireless data transmission. Each console game system 42 processes incoming status data records 78 and generates therefrom synchronizing data for transmission to portable game system 44 and 47 which causes processor 50 and graphics coprocessor 301 (FIG. 11) to generates picture element (pixel) data representing motion pictures of variable 3-D views of the simulated 3-D characters, objects, and game world(s). Each console game system 42 may also transmit data to portable game system 44 or 47 for display as still pictures, maps, numbers, words, and other images on LCD screen 22.

In addition to using touchscreen 23 for controlling movements of objects in the game world and indirectly the game worlds of other players in a session, portable game systems 44 and 47 may also be used as data entry devices as illustrated in FIGS. 3a, 18, 18a, and 18b. Alphanumeric messages, menu selection, pointing to objects, and controlling point of view can be entered on touchscreen 23 perhaps in coordination with touchpad 24 on console game system 42 (FIG. 14) and/or other control devices.

Touching touchscreen with a finger or stylus to point to an object in the simulated game world (FIG. 19) enters the coordinates (X,Y) of the object on LCD screen 22. After these coordinates are converted to 3-D coordinates in the simulated game world, they identify by table lookup the object being pointed to. This object identifier can then be automatically transmitted as a status record 78 (FIG. 27) from portable game system 47 to console system 42 to the Internet 121 to other players in the session with a text or sound message such as: "Wow, look at that!!" or blinking or highlighting the object to attract other players' attention to the selected object. After an object is selected by touching touchscreen 23, a text or sound message may be selected from a menu displayed on LCD 22 by another touch of touchscreen 23. A code identifying the selected message and a code identifying the selected object may be automatically transmitted as a status record 78 (FIG. 27) to other game systems which automatically display the selected object and generate the selected sound message for other players in the session to hear.

Pixel data representing variable 3-D views of moving objects in the simulated 3-D game world(s) may be generated as texture mapped polygons in both console game system 42 and in each portable game system 44 and 47 so that characters and other objects in the pixel data can be viewed from variable and rapidly changing points of view and angles selected by players. One player in a multi-player session may select a point of view that is different from the point of view selected by another player viewing the same character or object for display on two different LCD 22 screens on two different portable game systems 44 and 47 connected to two different console game systems 42.

If by chance, two players select substantially the same point of view for viewing the same character, both LCD 22 screens will show substantially the same image at substantially the same time, even though no image or picture data was transmitted between the two systems. The images will be the same because the spatial coordinates and orientation of the characters are the same as a result of the synchronizing status data (FIG. 27) shared among all systems in a session.

Pixel data representing variable 3-D views of the simulated 3-D game world(s) generated by different console game system processors 86 and image co-processors 316 (FIG. 13) in multiple console game systems 42 for display on respective console monitors 34 or television screens 56, will typically not show the same view because each player will control a different player character and the television screen will usually display a different player character. However, if two player characters are controlled to move to spatial locations that are close to each other and both players by chance choose substantially the same point of view to view their respective characters, then the corresponding images will show substantially the same scene that includes both player characters at the same time.

CPU processor 86 and image co-processor 316 in each console game system 42 generate texture mapped rendered polygons so that characters and other objects in the pixel data can be displayed from variable points of view and rapidly changing angles selected by players.

Manually operated handheld controller 185 generates control data in response to manipulation of control member 20 and other control members to controls console game system 42. Additional control data may be generated in portable game system 47 by manipulation of directional switch 15. By pressing button switch 15 or direction switch 14 or joystick 20 (see FIG. 1) on portable game system 47, a player can command system 42 to temporarily transfer control data from controller 185 through link 186 to portable system 47 to control images on LCD 22 and 33 from controller 185.

Alternatively, player 10 could retain control of his player character using controller 185 and use control members on portable system 47 to select points of view and objects for display on LCD 22 and 33. Since this would be difficult for players with only two hands, this alternative is most suitable for multi-player games that accept control data from two players controlling the same console game system 42 as described above with reference to FIG. 7.

Figure 9:
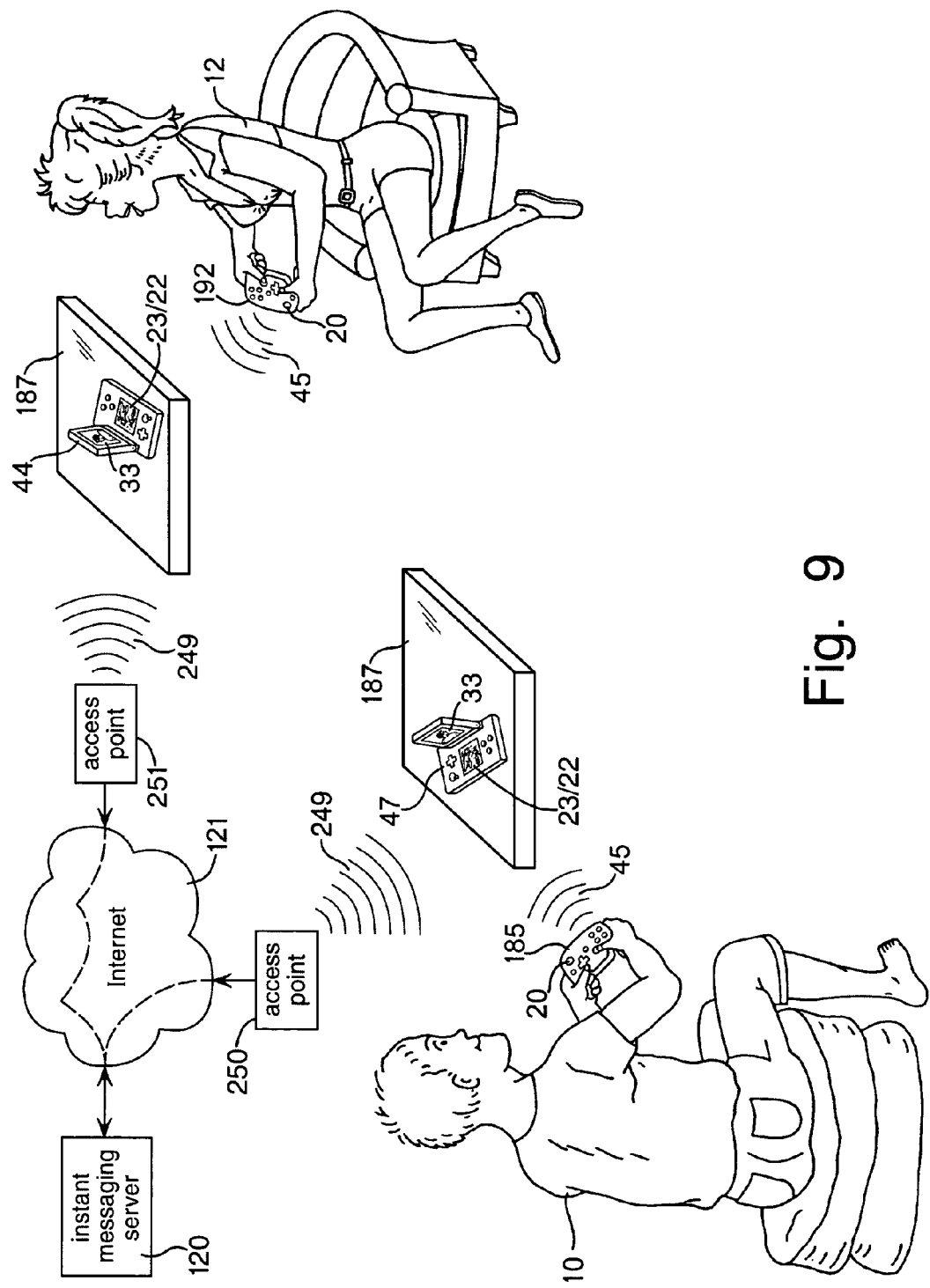
FIG. 9 illustrates a game playing session in which two distantly separated game players control wireless Internet-linked portable game systems that have touchscreens and two LCD screens each.

FIG. 9 illustrates a game playing session in which two distantly separated game players control wireless Internet-linked portable game systems 47 and 44 that each have touchscreen 23, LCD 22, and LCD 33.

The system in FIG. 9 may be another part of the networked game described above with reference to FIG. 8, portable game systems 47 and 44 are operated as auxiliary displays and are shown resting on tables 187 so that they may be controlled by handheld controllers 185 and 192. Portable game systems 47 and 44 interface directly with the Internet 121 through preexisting access points 250 and 251, without a need for console game system 42 in FIG. 8. Portable game system 47 is wirelessly linked to Access Point 250 through local wireless bi-directional data transmission link 249. As with multiple console game systems 42 in FIG. 8, status data records 78 (FIG. 27) are exchanged through the Internet 121 between portable game systems 47 and 44 to provide agreement between the simulated game worlds generated in each portable game system and to exchange messages of words, sounds, pictures, graphs, numbers, and other information.

Figure 11:
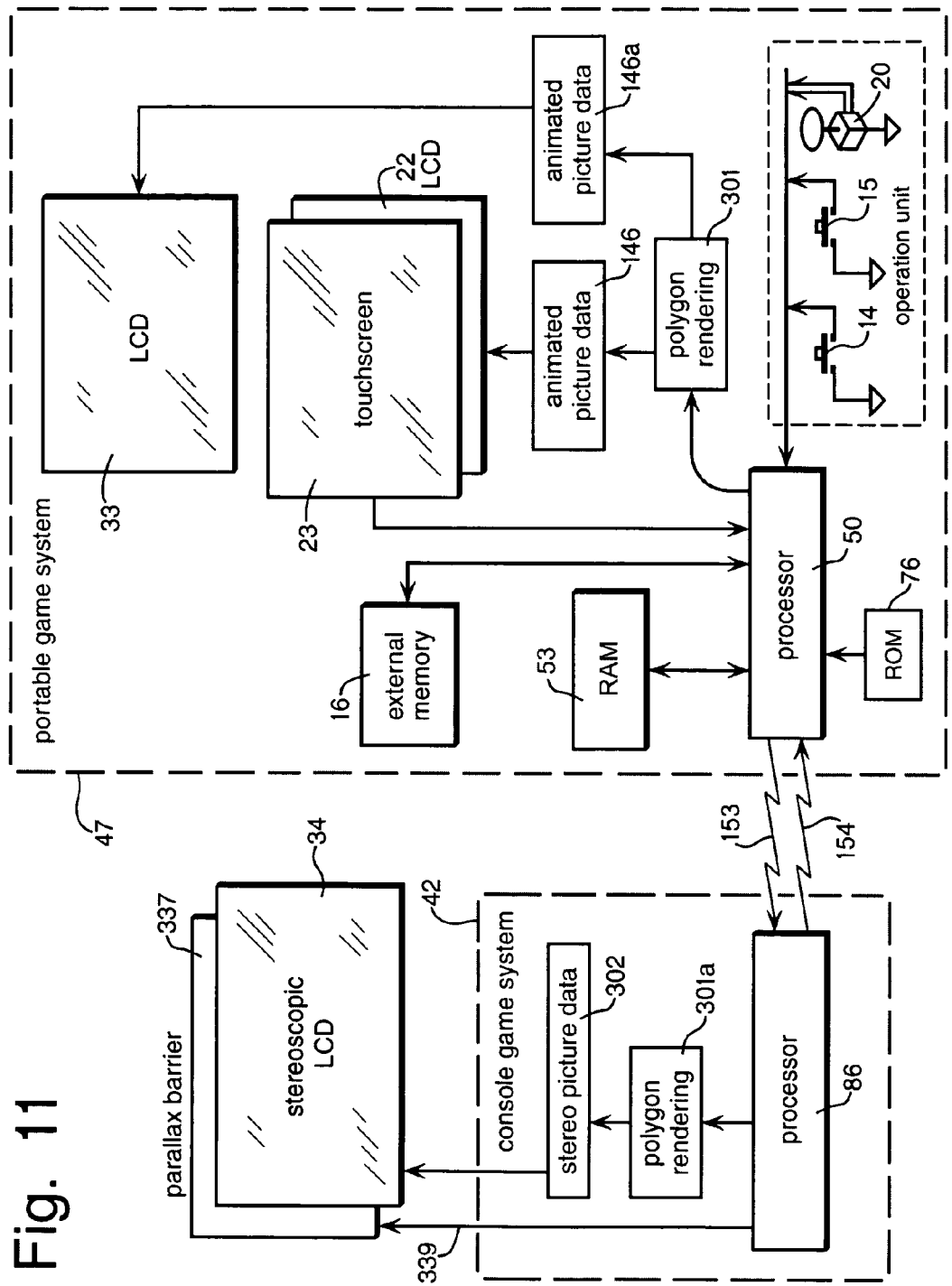
FIG. 11 is a block diagram of a FIG. 1 portable game system that has a touchscreen and two LCDs and is wirelessly linked to a console game system with an autostereoscopic LCD monitor.
Figure 12:
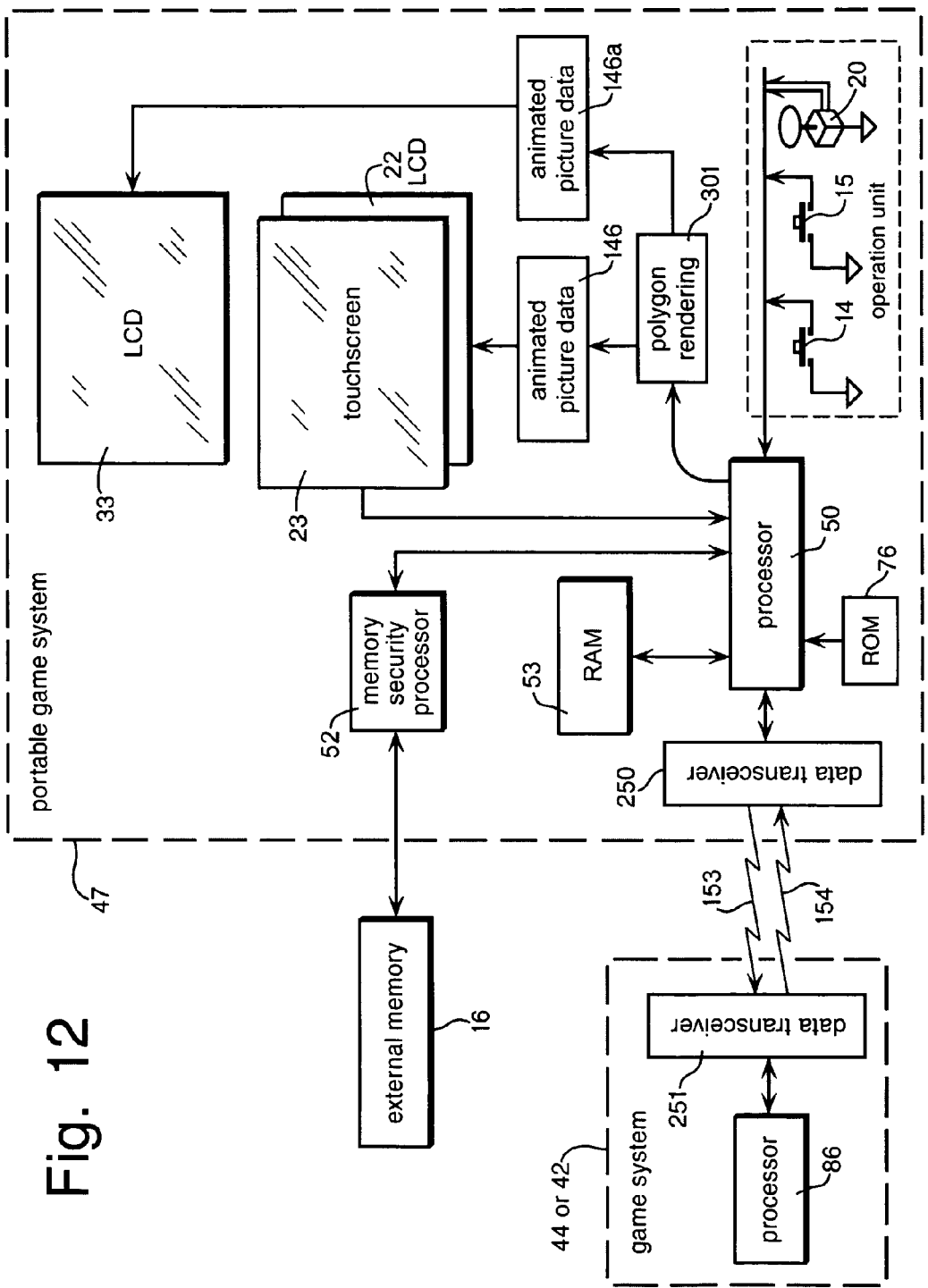
FIG. 12 is a block diagram of a FIG. 1 portable game system that has a touchscreen and two LCDs and is wirelessly linked to a second FIG. 1 portable game system.

FIG. 10 is a block diagram of portable game system 191 that is also shown in FIGS. 2 and 5 and which lacks a second LCD device 33 that is present in portable game system 47 shown in FIGS. 1, 11 and 12. Portable game system 191 may connect to console game system 42 (FIG. 13) or to another portable game system, through wireless data link 186 or wire cable equivalent. Portable game system 191 comprises touchscreen 23 and control processor 51 for determining finger or stylus locations on touchscreen 23 and LCD 22. If portable system 191 includes touchpad 24, control processor 51 also processes signals from touchpad 24. Touchscreen control processor 51 outputs X and Y coordinates to cpu processor 50 which generates pictures and text that are transferred by LCD driver 119 to LCD 22 for display. A graphics coprocessor (not shown) is preferred to efficiently generate and render polygon data from data models that represent characters and other objects displayed on LCD 22. Graphics processing may also be performed on processor 50.

FIG. 11 is a block diagram of the major components of an exemplary portable game system 47 also shown in FIGS. 1, 7, 8, 9, 12, and other figures herein. Portable game system 47 comprises two LCD panels 22 and 33 which display animated picture (pixel) data 146 and 146a. Portable game system 47 also comprises touchscreen 23 and control processor 51 for determining finger or stylus locations on touchscreen 23. If portable system 47 includes touchpad 24 as in FIG. 10, touchscreen control processor 51 also processes signals from touchpad 24. Touchscreen control processor 51 outputs X and Y coordinates to cpu processor 50 which generates pictures, text, and other images that are displayed on LCD 22 and LCD 33.

A graphics coprocessor (not shown) cooperating with cpu processor 50, is preferred to efficiently generate and render polygon data from data models that represent characters and other objects displayed on LCD 22 and 33. Such a coprocessor may perform scrolling, flipping, blending, scaling, rotating, fading, windowing, coordinate transformations of polygons and vertices, projection, clipping, rasterizing, z-buffer comparison, polygon rendering, texture mapping, terrain rendering, bump mapping, lighting, shadows, shading, and related graphics processing functions indicated by box 301 in FIGS. 11 and 12. Graphics processing may also be performed on processor 50.

Processor 50 also generates data records (FIGS. 27-28) that processor 50 transfers to console game system 42 through "wireless" data transceivers 250 and 251 (FIG. 12) and bi-directional data transmission link 153 and 154 which preferably use RF radiation in accordance with the IEEE 808.11 standard. Alternatively, other forms of data transmission may be used such as infrared, ultrasound, and wire cable. Processor 50 also interprets data records received from console 42, including records containing data that indicate the status of objects in the simulated game world, so that processor 50 generates picture element (pixel) data 146 and 146a representing pictures for display on LCD 22 and LCD 33 in accordance with this status data. Bi-directional data link 153 and 154 or wireless equivalent is numbered 186 in FIGS. 4 and 6.

Processor 50 may receive data through data link 154 from another portable game system 44 (FIG. 12) and this data may affect execution of programs in processor 50 which may send data through data link 153 to console system 42 to affect execution of programs in processor 86. Various data record formats may be transmitted between two or more game systems 42 and 47.

When electric power to portable game system 47 is turned on, boot ROM 76 provides an initial program of instructions. Additional programs may be downloaded into RAM 53 through data link 154 from console game system 42 which may read these portable programs from disk 43 or another memory cartridge 16 or from the Internet 121 (FIG. 13).

Portable game system 47 may include various other features such as external memory cartridge 16 containing a ROM and/or battery-powered RAM, data and address buses, input/output processor, battery power source, circuit board, and other customary components.

Portable game system 47 may be operated as a stand-alone system as illustrated in FIGS. 1, 3, and 3a, with or without a handheld control unit 185. An external memory cartridge 16 containing a ROM, battery-powered SRAM, optical disk, or other external memory device storing a game program and data is typically present when portable game system 47 is used as a stand-alone handheld game system.

Portable game system 47 also comprises RAM 53 for storing game programs and data, button switches 14, direction switches 15 (only one of the 4 switches is shown), and analog joystick 20. Touch-sensitive pad 24 (FIG. 10) may substitute for joystick 20 or supplement joystick 20 for use by a player who is manually controlling one or more player characters and other 3-D objects. Picture data (pixels) 146 and 146a representing such animated 3-D objects in the simulated game world are generated by processor 50 for display on LCD 22 and 33.

In portable game system 47, game programs stored in RAM 53 are executed by processor 50 which may generate graphics commands that control generation of picture data elements (pixels) 146 and 146a of moving 3-D objects in a simulated 3-D game world from textured polygons by graphics process 301 so that 3-D characters and other objects in picture data 146 can be generated from variable and rapidly changing 3-D viewpoints and angles selected by players and/or selected by program instructions executed by processor 50. The animated 3-D objects may be player controlled and may resemble animals or human characters that have hands, arms, legs, faces, and clothing and perform 3-D actions in a simulated 3-D game world.

Processor 50 may process the following data stored in RAM 53: graphics data for a simulated 3-D world, graphics data for 3-D characters and other objects, model definitions (polygons, textures, vertex coordinates, etc) of characters, objects, and terrain, joint articulation data, bumpmap data, 3-D locations and 3-D orientation of objects, data specifying movements of objects, input data from touchscreen 23 and control devices, data for 2-D maps, word menus, picture menus, audio data, buffer data for transmission to and from other game systems, and other data.

Execution of game programs in processor 50 is controlled by manually entered input control data from control devices such as touchscreen 23, direction-switch 15, analog joysticks 20 and 21 (FIG. 7), touch-sensitive pad 24 (not shown), button switches 14 (which may also be touch-sensitive sensors), motion sensors, and/or other manual controls.

This input control data results from a human player's decisions based on observed animated pictures that are displayed on LCD 22 and 33 from picture data 146 and 146a generated by microprocessor 50 executing programs in RAM 53 and rendered by process 301. This picture data 146 and 146a may be stored as rows and columns of pixel data which are converted to a dot matrix for display on LCD 22 and 33.

Console game system 42 in FIG. 11 comprises processor 86, LCD 34, and other components discussed below with reference to FIG. 13. In the preferred embodiment, LCD 34 displays autostereoscopic images (which require no eyeglasses or head-mounted display), so that a player may experience full depth perception of 3-D characters and other objects in the 3-D world viewed from different viewpoints on LCD 22 or 33 or both.

In the autostereoscopic LCD device 34 described below with reference to FIG. 33, the stereoscopic feature may be electrically enabled and disabled so that LCD 34 may also display non-stereoscopic images such as maps, words, numbers, menus, 2-D pictures, and 3-D pictures non-stereoscopically. In FIG. 11, processor 86 generates signal 339 which enables or disables parallax barrier 337 (FIG. 33) in LCD 34. If signal 339 is not enabled, parallax barrier 337 is transparent and non-stereoscopic images can be displayed on LCD 34.

FIG. 12 is a block diagram of a linked system similar to that described above with reference to FIG. 11, but with a second portable game system 44 in place of console game system 42 shown in FIG. 11. Portable game system 44 has the same design as portable game system 47 in this example. Status data may be exchanged between systems 44 and 47 to provide updates to the simulated game worlds generated in RAM 53 in both systems 44 and 47 so that both players are playing from the same game world. This status data may include data described below with reference to FIG. 27.

FIG. 13 is a block diagram of the major components of console game system 42 which is illustrated in perspective view in FIGS. 2 and 14. Console game system 42 comprises a disk reader 83 for reading optically coded disk 43. Equivalent non-disk data carriers may be substituted for disk reader 83 and disk 43 such as external semiconductor memory 16, memory stick, battery-powered RAM, disk cartridge, and other non-volatile memory media. Data carriers also may comprise records or packets containing programs and/or data that are downloaded from another game unit or server into RAM 90.

Console game system 42 also comprises serial port 87 for data transmission (preferably wireless) with handheld controller 185, harddisk drive 325 for storing game programs and data that are downloaded from Internet 121, RF transceiver 251 for bi-directional data transmission with portable game system 47 (FIG. 12), touchpad 24 for stylus and/or finger data entry, and peripheral interface processor 88 for audio to speaker 331 and from microphone 334.

Console game system 42 also comprises RAM 90 for storing other data, boot ROM 91 for power up and reset and may include an operating system such as DOS, and crypto micro processor 126 (CMP) for decrypting and executing encrypted programs from Internet 121, disk 43, or external memory 16.

Console game system 42 also comprises CPU processor 86 and graphics co-processor 316 for generating images of three-dimensional objects and textures from a given point of view and "camera angle" in a three-dimensional game world in the form of displayable picture data elements (pixels) in VRAM 302 for display on LCD 34 through LCD driver 119.

Graphics coprocessor 316 may perform scrolling, flipping, blending, scaling, rotating, fading, windowing, coordinate transformations of polygons and vertices, projection, clipping, rasterizing, z-buffer comparison, polygon rendering, texture mapping, terrain rendering, bump mapping, lighting and shadows, shading, and related graphics processing functions.

LCD 34 may be a conventional discrete display device such as LCD 22 that is also used in portable game system 47. Video processing for display on TV screen 56 (FIGS. 16-17) may be substituted for LCD 34 when used in a non-stereoscopic system.

Console game system 42 also comprises network interface 137 and RF transceiver 250 (such as IEEE 802.11) for data transmission with wireless access points that provide access to Internet 121 or other network. Such data transmission is described below with reference to FIGS. 15 and 26. Messaging server 120 is described above with reference to FIG. 8.

In the preferred embodiment, LCD 34 displays autostereoscopic images (which require no eyeglasses or head-mounted display), so that a player may experience full depth perception of 3-D characters and other objects generated from different viewpoints and angles in 3-D game worlds, displayed on LCD 34, and viewed by a human player from an optimal position.

In the autostereoscopic LCD device 34 described below with reference to FIG. 33, the stereoscopic feature may be electrically enabled and disabled so that LCD 34 may also display non-stereoscopic images such as maps, words, numbers, menus, 2-D pictures, and 3-D pictures non-stereoscopically under program control. In FIG. 13, processor 86 generates signal 339 which enables or disables parallax barrier 337 (FIG. 33) in LCD 34. If signal 339 is not enabled, parallax barrier 337 is transparent and non-stereoscopic images can be displayed on LCD 34.

Figure 32:
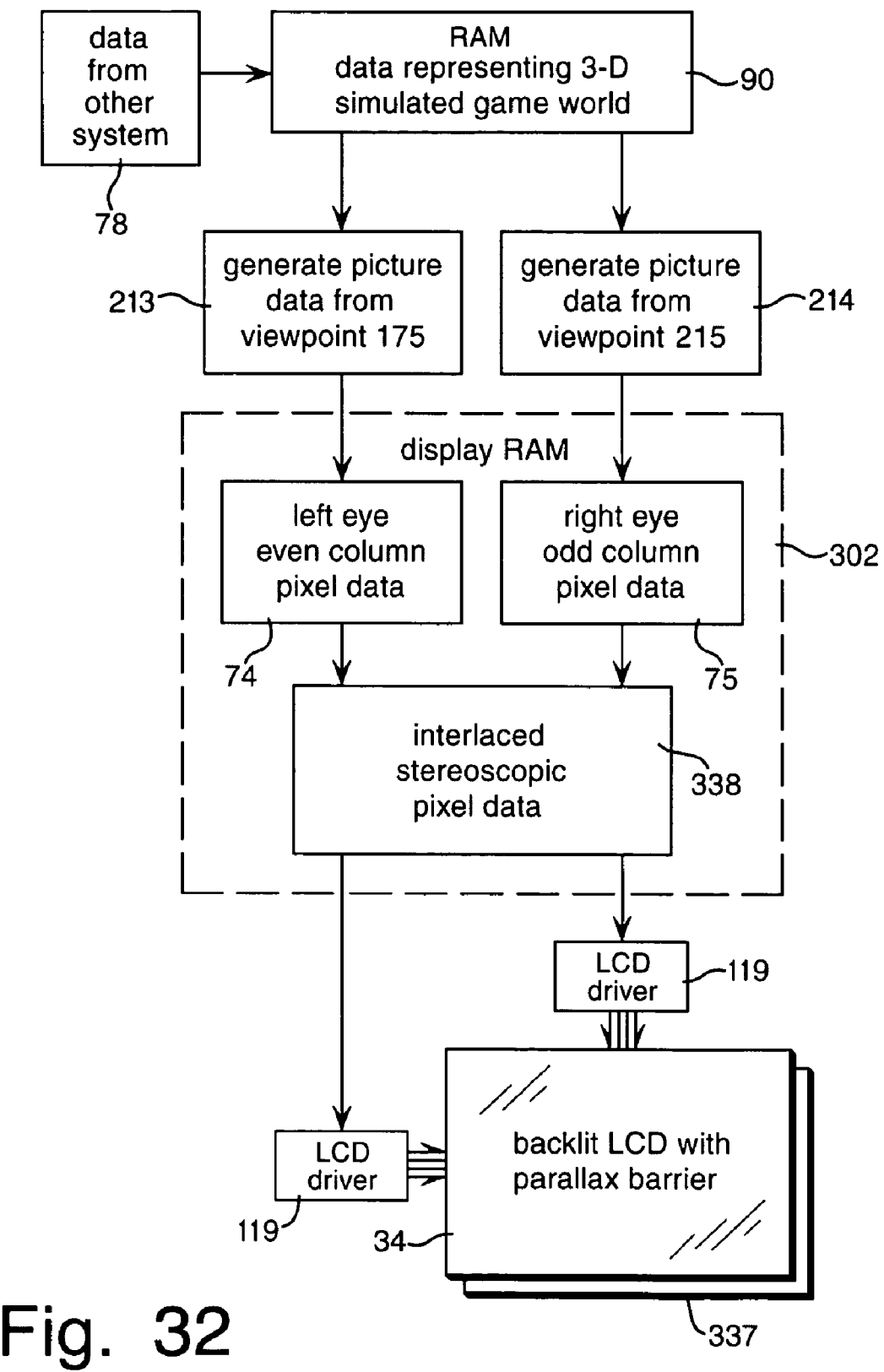
FIG. 32 is a block diagram illustrating how images of a simulated 3-D game world are generated from two viewpoints for stereoscopic display on an LCD.

When parallax barrier 337 is enabled for stereoscopic display, processor 86 and coprocessor 316 generate a sequence of pixel data arrays representing 3-D texture-mapped polygon objects moving in a 3-D game world from two related points of view, one generated from viewpoint 175 (FIG. 34) for the left eye (process 213 in FIG. 32) and a second view generated from viewpoint 215 (FIG. 34) for the right eye (process 214 in FIG. 32). This pixel data is stored as interlaced odd and even columns in display VRAM 302 which are converted by LCD driver 119 to a dot matrix on LCD 34. This stereoscopic process is further described below with reference to FIGS. 32, 33, and 34.

FIG. 14 is a perspective exterior view of console game system 42 that comprises: housing base 199 attached by hinges 198 to display support 197 supporting autostereoscopic LCD screen 34. Disk 43 shown in FIG. 13 may be played within housing base 199 under a hunged lid as illustrated in FIG. 14. Built-in manual controls comprise: button switches 14, direction-switches 15 and touchpad 24. External memory cartridge 16 is shown plugged into a socket (not shown) in base 199. Dual speakers 27 provide binaural sound.

Figure 15:
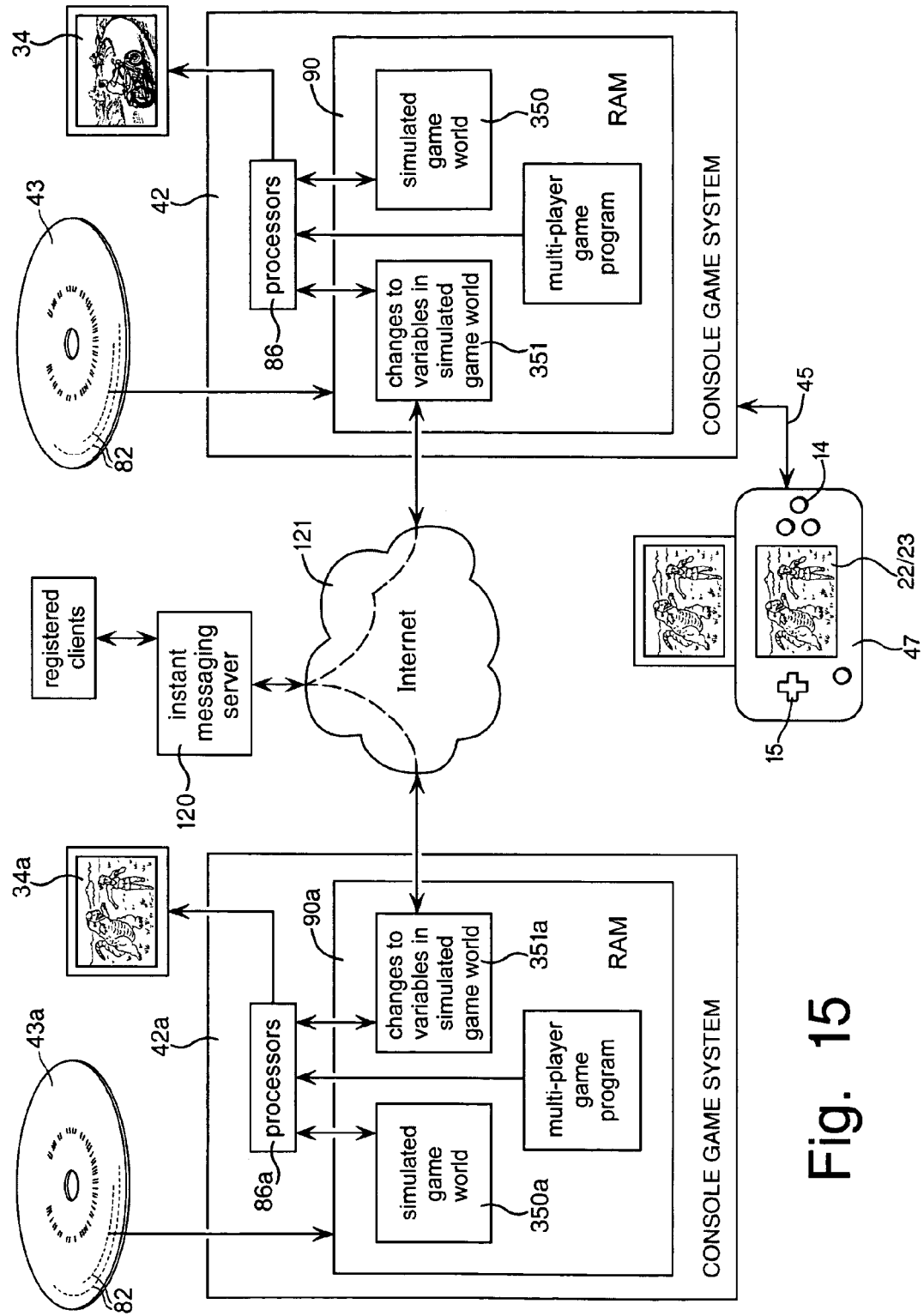
FIG. 15 is a conceptual block diagram of two console game systems linked by the Internet.

FIG. 15 is a block diagram that illustrates data flow between two video game systems 42 and 42a, messaging server 120, and portable game system 45. When the operators of the two systems 42 and 42a logon to messaging server 120, they are registered as clients on the messaging server files. System 42 on the right loads a multiple-player game program and data from disk 43 into RAM 90. Meanwhile, system 42a on the left loads the same multiple-player game from disk 43a into RAM 90a. Processor 86 in system 42 and processor 86a in system 42a execute the same game programs which generate data representing the same simulated 3-D game world in RAM 350 and 350a in both systems.

As the game progresses, system 42a on the left generates changes to the original game world that reflect movements of objects and other changes to variables in the simulated game world. These changes are cumulative and in RAM 90a, the changes 351a update the original simulated game world 350a. As described above with reference to FIG. 8, every time there is a change to a variable in the simulated game world 350a, a status record 78 (FIG. 27) is generated detailing the change. This status record is transmitted through Internet 121 to system 42 and other systems in a session, either directly or through messaging server 120. When system 42 on the right receives the status change record, it is processed and incorporated into the cumulative changes in RAM 351 and to the updated simulated game world in RAM 350 so that both simulated game worlds 350 and 351a, including cumulative changes, are substantially the same.

System 42 generates first picture data for display of the motorcyclist character 18 moving in the simulated game world on monitor 34 that agree with any changes 351 to the game world that affect character 18 or other objects in the simulated game world 350.

System 42 also generates and transmits game data to portable game system 45 through data link 45, preferably wireless. This game data represents all of the changes that have occurred to the simulated game world that affect the area of the game world that will be displayed on LCD 22 on portable game system 45. In this example, the player operating portable system 45 wants to display on LCD 22 the other player's character 17 (the woman) in the dinosaur scene that is also being displayed on monitor 34a. Likewise, the player operating system 42a on the left also has a portable game system 44 (see FIG. 8) which can display on LCD 22 or 33 the motorcycle scene because the simulated game world 350a represents an updated world that includes the latest location, direction, etc of the motorcycle rider.

Figure 16:
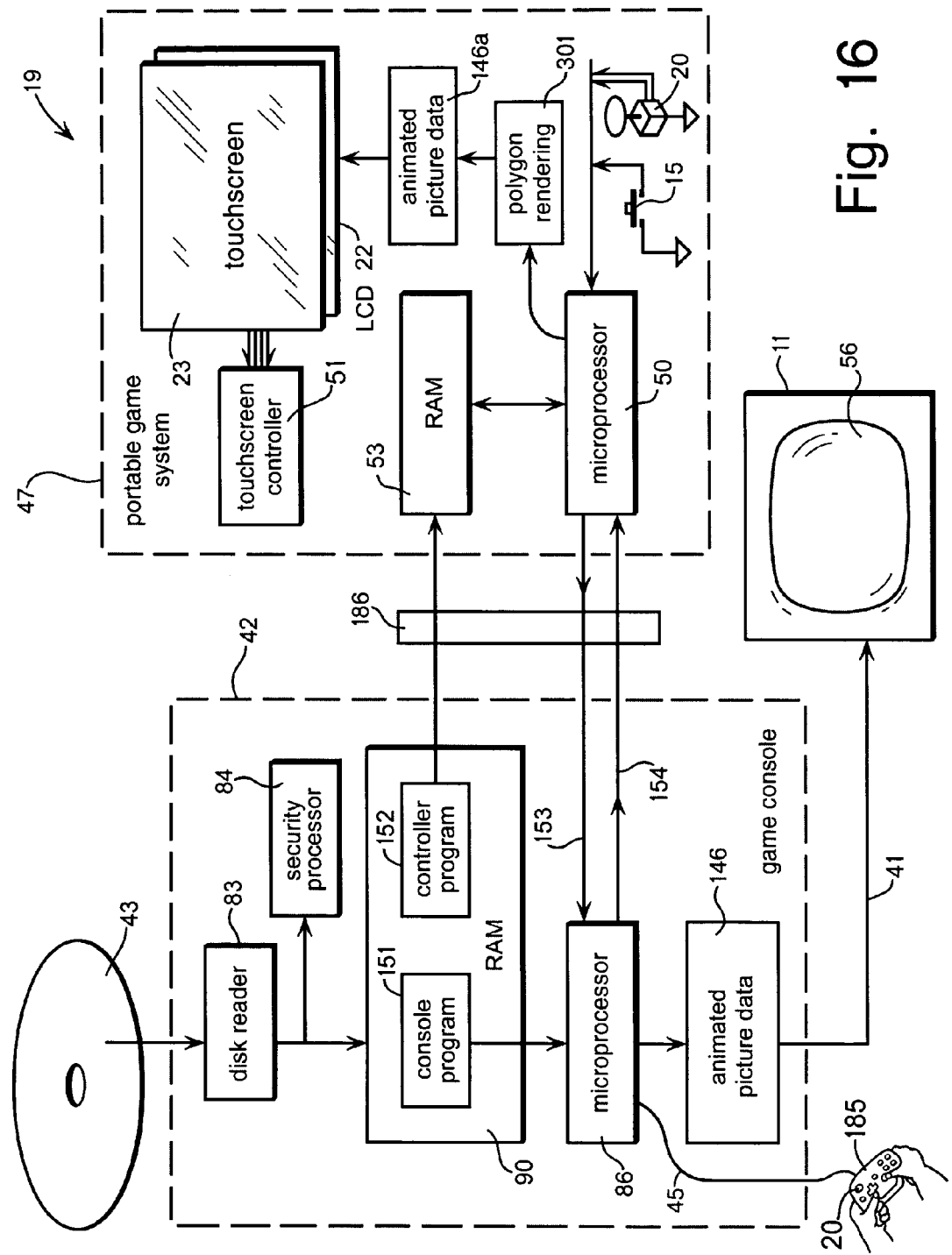
FIG. 16 is a simplified block diagram of the system showing how programs are downloaded and data flows between a console game system and a portable game system.

FIG. 16 shows block diagram of an exemplary system 19 showing how data flows between console 42 and portable game system 47. When disk reader 83 reads game programs into RAM 90, the programs in this example are of two kinds, console program(s) 151 with associated data, and controller program(s) 152 with associated data. Controller program 152 is transferred to RAM 53 in portable game system 47 and executed in processor 50. Console program 151 is stored in RAM 90 and executed by processor 86 which generates animated picture element (pixel) data 146 representing one or more animated characters performing an action. This data stored in RAM 146 is converted to a video signal in this example for display as animated pictures on TV screen 56. Processor 86 also generates data records 78 which are transferred through data link 154 to portable game system 47. Examples of data records 78 are shown in FIG. 27. Other record formats may be generated or processed by programs 151 and 152.

Execution of console program 151 in processor 86 is controlled by data received through data link 153 by console 42 from processor 50 in portable game system 47. Processor 50 receives through data link 154 the data records 78 generated by processor 86 and this data affects execution of program 152 in processor 50 which also receives manually entered input signals from cross-switch 15 (only one of the 4 switches is shown), analog joystick 20, touchscreen 23, and/or other manual controls. These input control signals result from a human player's decisions based on animated pictures displayed on LCD 22 from animated picture data 146a generated by processor 50 executing program 152 in RAM 53. The input signals also control execution by processor 50 which sends corresponding data records 78 through data link 153 to processor 86.

Figure 17:
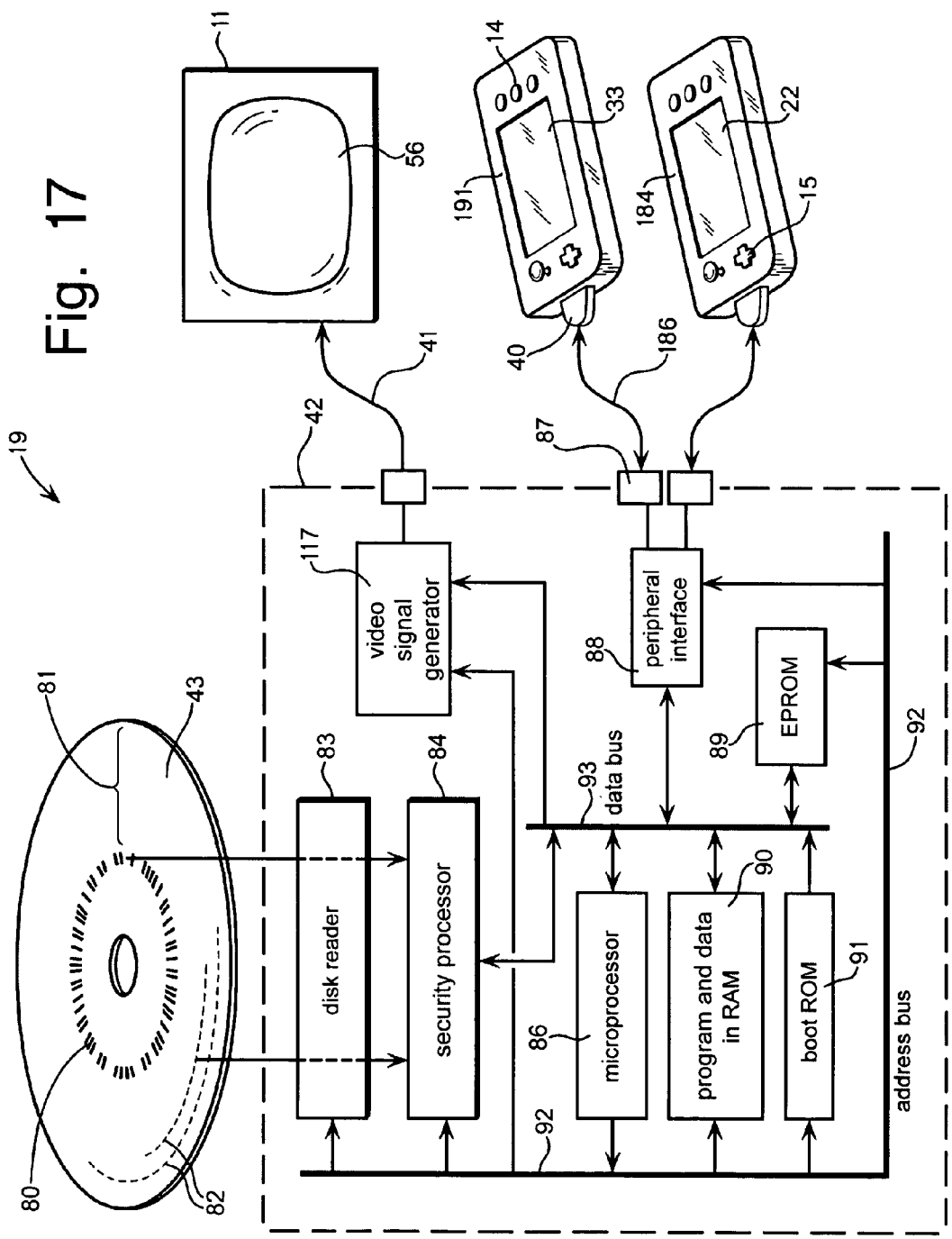
FIG. 17 is a block diagram of a video game system having a console linked to two portable game systems and two LCD displays.

FIG. 17 is a block diagram of an exemplary video game system that is also shown in FIG. 16. Video game console 42 includes a housing indicated by the dashed line in FIG. 17 and shown in perspective view in FIG. 2. Disk 43 is shown outside this housing for clarity, but may be played within the housing. Video signal generator 117 for generating a signal for display on TV 11 screen 56 is an alternative embodiment to the console system 42 depicted in FIG. 14.

FIG. 18 illustrates a method of entering alphameric characters using touchscreen 23 overlaying LCD 22. After selecting a series of characters by touching touchscreen 23 over the displayed characters, button 57 is pressed only once to enter the multi-character data. For games that are downloaded from the Internet after payment by credit card, the touchscreen method illustrated in FIG. 18, for entering credit card numbers, may be used so that entry of such numbers can be easily kept hidden from other people when entered on a portable game system. Connector 40 for communications between portable game system 47 and game console 42 may be connected by a wire cable 45, or wireless through an RF transceiver 250 (FIG. 5), or a transceiver using infrared photodiodes 38.

Figure 18A:
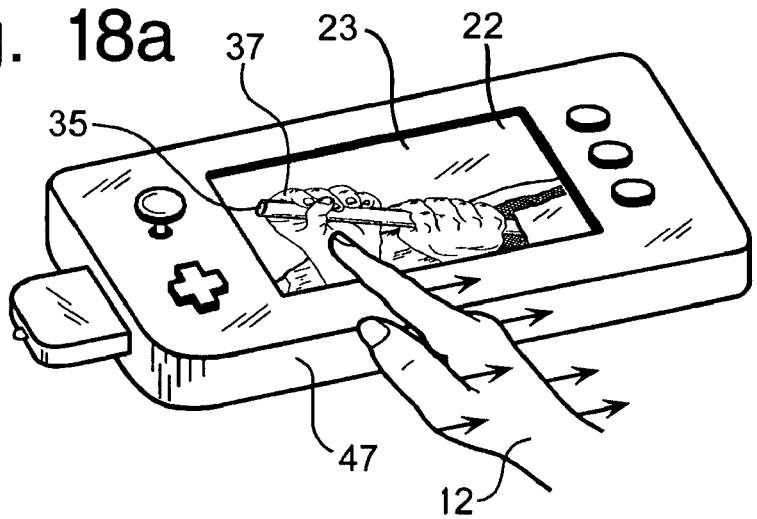
FIG. 18a is a perspective view of a portable game system with an LCD touchscreen illustrating manually controlled movement of a selected picture object.

FIG. 18a illustrates use of touchscreen 23 to move a simulated object 37. The preferred method in FIG. 18a is for human player 12 to touch her finger or stylus to touchscreen 23 overlying the LCD image of hand 37 and slide her finger across touchscreen 23 to a new location over pipe 35 to cause corresponding movement of hand 37 grasping pipe 35. Touchscreen 23 signals the finger location to controller 51 (FIG. 5), which converts the location to physical X,Y coordinates, which processor 50 uses to calculate a new LCD location for displaying hand 37. Thus simulated hand 37 will follow the player's moving finger on the touchscreen without any need for a cursor. When the location of hand 37 is within preprogrammed coordinates for pipe 35, processor 50 (FIG. 5) recomputes the pixels for LCD 22 display from a polygon model representing hand 37 in successive frames, so that the hand appears to grasp and move pipe 35 displayed on the LCD. See further discussion below with reference to FIGS. 19 and 19a.

Processor 50 also sends a series of data records (FIGS. 27-28) to console 42 selecting a branch in the branching structure of alternative sequences of hand movements, showing hand 37 moving to the location of pipe 35, rotating to a new angle facing pipe 35, and grasping pipe 35. CPU processor 86 (FIG. 13) and graphics coprocessor 316 in console 42 then generate the corresponding sequence of rendered polygons for hand 37 and pipe 35 for the frame sequence displayed on LCD screen 34. With this FIG. 18a method, players can use their portable game systems as handheld touchscreen controllers to indicate movement of objects to new locations in 3-dimensions and indicate actions to be performed and generated in console 42 as stereoscopic images for display on LCD 34 (FIG. 7).

Figure 18B:
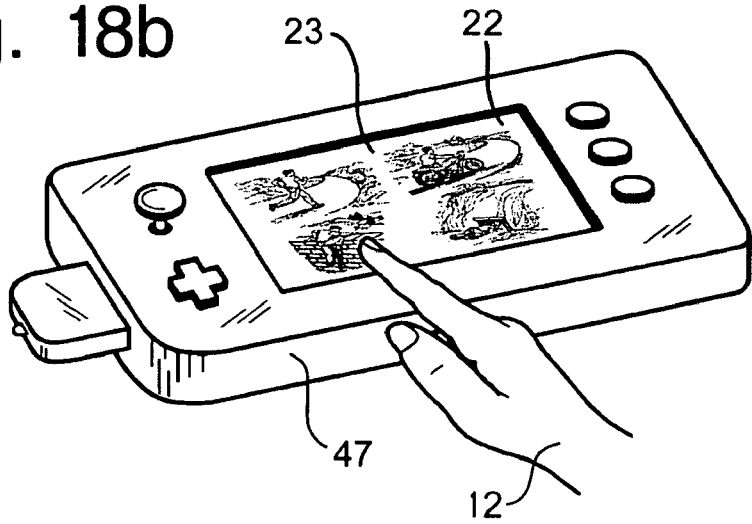
FIG. 18b is a perspective view of a portable game system with an LCD touchscreen illustrating manual selection of an action to be performed by a game character from a picture menu of alternative actions.

FIG. 18b illustrates a menu of alternative actions which appears on LCD screen 22 awaiting selection by human player 12. LCD screen 22 is overlaid by touchscreen 23 (FIG. 12) so that the next action for character 18 to perform among these four alternative actions is selected by player 12 touching the touchscreen 23. Character 18 in each of the four action pictures may be the same character, a player controlled character who is controlled by player 12. When player 12 touches one of the four touchscreen areas corresponding to the four pictures in FIG. 18b, touchscreen controller 51 (FIG. 10) generates data indicating which of the four corresponding locations is selected. Processor 50 then begins one of the four possible action sequences.

Figure 19:
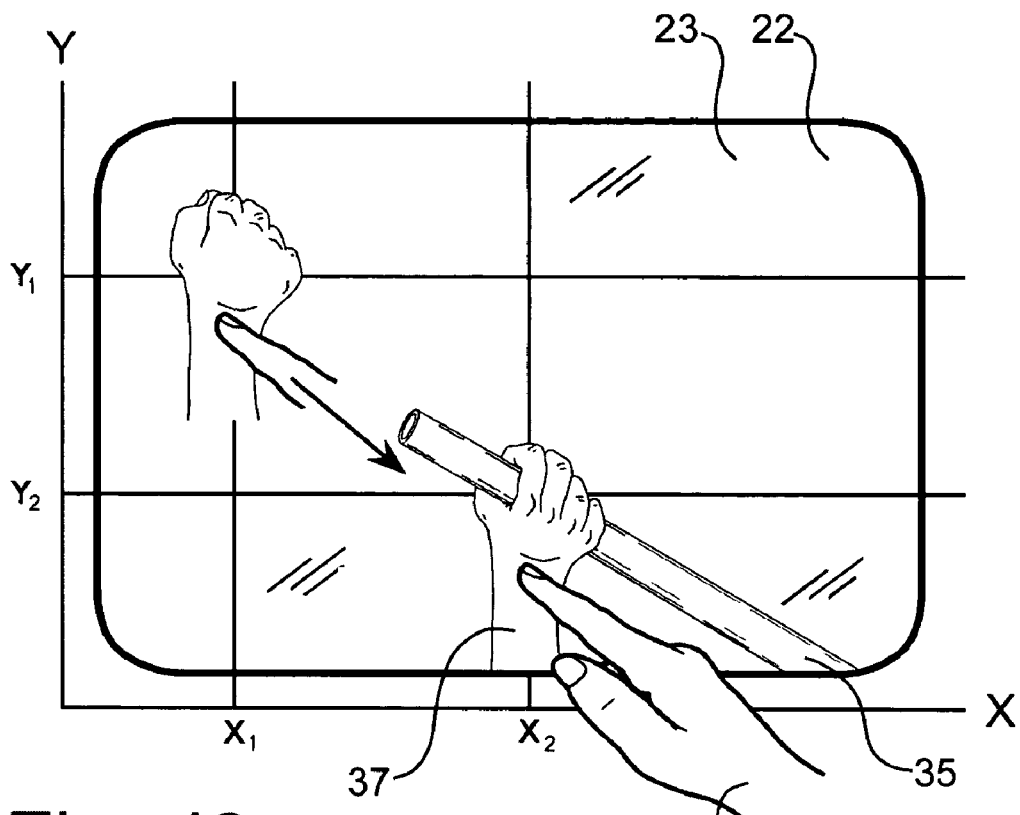
FIG. 19 represents a touch-sensitive LCD screen with cartesian coordinates to illustrate manual selection and movement of simulated objects such as a simulated hand.

FIG. 19 illustrates manual use of touchscreen 23 with X,Y coordinates for indicating a two-dimensional location on the underlying LCD screen 22 (FIG. 11). FIG. 19 shows hand 37 shaped as a first and located at coordinates $(X_1\ Y_1)$. Human player 12 places her finger over the image of hand 37 on touchscreen 23 and moves her finger on touchscreen 23 in the direction of the arrow to location $(X_2\ Y_2)$. The hand image on LCD 22 is regenerated in a sequence of frames to follow her finger as described above with reference to FIG. 18a. Pipe 35 intersects coordinates $(X_2\ Y_2)$ and hence when hand 37 intersects pipe 35 at coordinates $(X_2\ Y_2)$ the program being executed in microprocessor 50 in portable game system 47 interprets this collision as a command to show hand 37 grasping whatever object is at coordinates $(X_2\ Y_2)$—in this example pipe 35.

The polygons 114 (FIG. 19a) which form the image of hand 37 on LCD 22 are then modified by microprocessor 50 to show hand 37 grasping pipe 35 on LCD 22. If player 12 implements this action, processor 50 sends data to console 42 where processor 86 (FIG. 12) modifies corresponding polygons which form the image of hand 37 in the generated images displayed on monitor 34 (FIG. 13). Hence, when touchscreen 23 is used to move an object in the picture on LCD 22 from one LCD location to another location, the resulting action may appear on both LCD screen 22 and monitor 34.

The X,Y coordinates in FIG. 19 may be denominated in pixels or millimeters and refer to the visible area of LCD screen 22 and corresponding area of touchscreen 23. Since the picture on LCD 22 is a two-dimensional picture, there is no Z coordinate from touchscreen 23. The X,Y coordinates on LCD screen 22 should not be confused with simulated coordinates X,Y,Z in a simulated 3-dimensional world.

Figure 20:
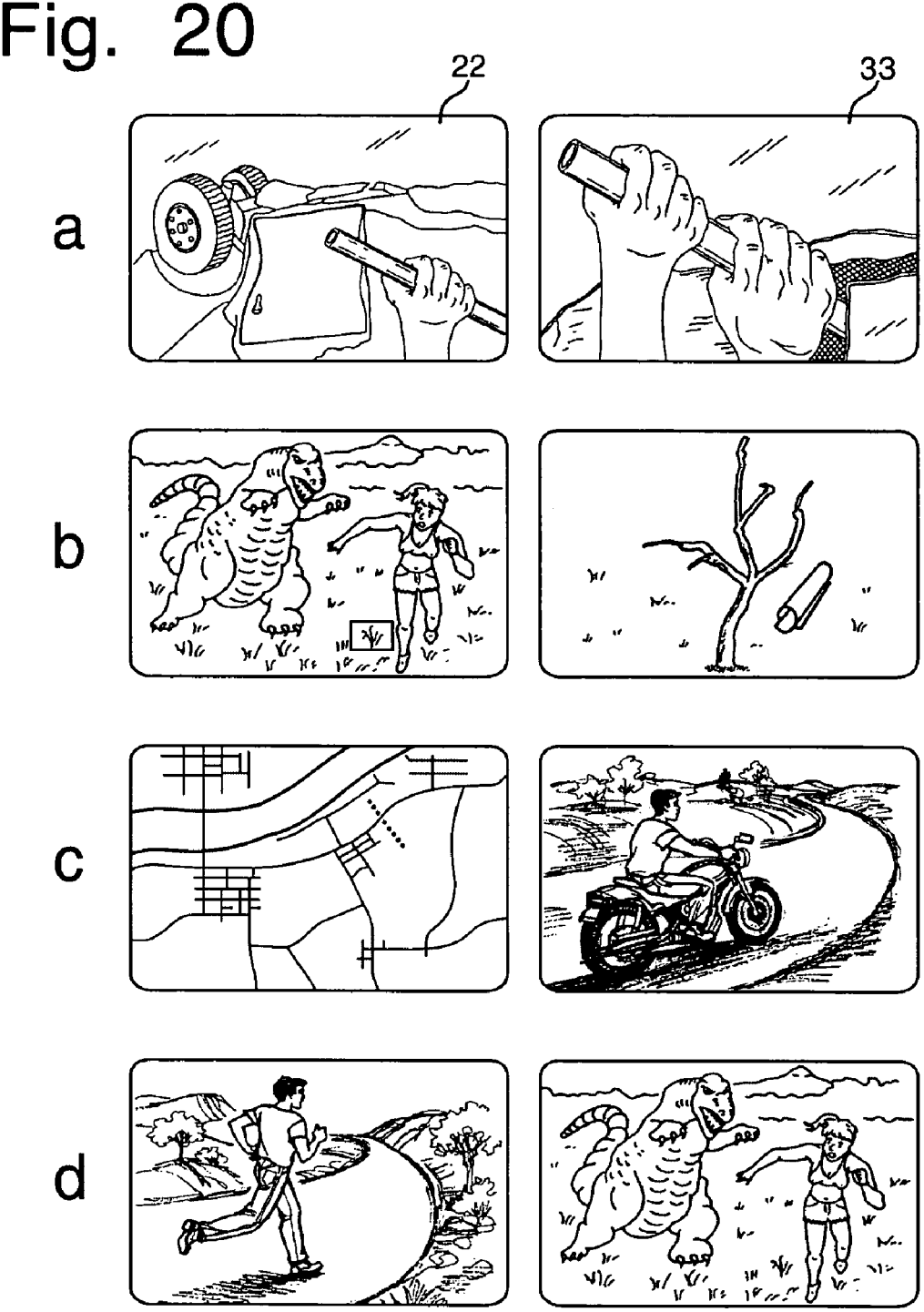
FIG. 20 illustrates five examples of pairs of images for display on two LCD screens.

FIG. 20 illustrates 3-D images that may be displayed on LCD 22 and LCD 33 in portable game system 47 in FIG. 1 and other drawings. For example, a 2-D map FIG. 20c may be displayed on LCD 22 while the 3-D view of a motorcycle and rider may be displayed on LCD 33. Another example is FIG. 20d where both LCDs display images of a 3-D world and 3-D characters.

Figure 21:
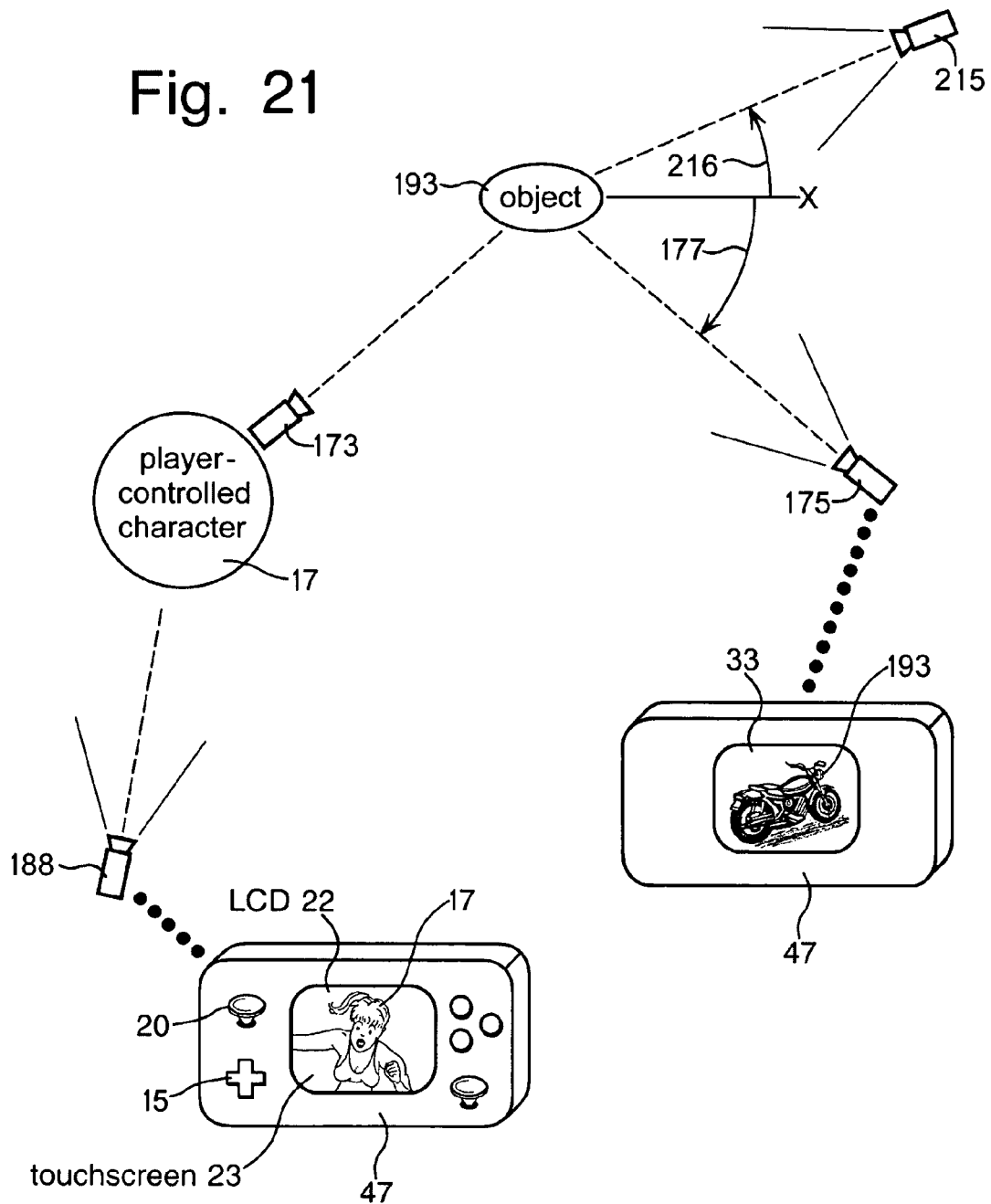
FIG. 21 illustrates display of objects simultaneously on two LCD devices from variable points of view around an object.

FIG. 21 illustrates how a picture displayed on LCD screen 22 in portable game system 47 may differ from a picture displayed on the second screen 33 in the same portable game system 47 (FIG. 1), depending on the point of view (perspective) from which a simulated "camera" is pointed within a three-dimensional world generated by the portable game system(s). In this example, there are two simulated point of view "cameras" 175 and 188. The picture generated from the perspective of camera 188 appears on LCD 22 (which has touchscreen 23) and includes, in this example, a front view of player-controlled character 17 running from an attacking dinosaur.

Point of view "camera" 175 views an object 193 which, in this example, is a player-controlled motorcycle 193. The picture generated from the perspective of camera 175 appears on LCD screen 33 in portable game system 47. The relationships between the cameras and display screens are indicated by lines of dots in FIG. 21. A player can manually change angle 177 to direct camera 175 at various angles and points of view (labeled 175 and 215 in this example) to view object 193.

In multi-player games in which opposing players are present, it may be important for each player to conceal from other players any knowledge of which object 193 a player is viewing and from what point of view, i.e. what image is generated from the point of view of "camera" 175. This concealment is achieved in this example by displaying object 193 on LCD screen 33 that is hidden from other players by the housing of portable game system 47 in which LCD 33 is a component (see FIG. 1).

A player may control movements, directions, zoom, and point-of-view perspectives of cameras 188, 173, 175 or 215 using a directional input control device, such as touchscreen 23 in portable game system 47 (FIG. 1) or joystick 20 on control unit 185 (FIG. 4) or portable game system 47. Object 193 may be viewed from any angle such as 177 or 216 horizontally and in three dimensions from above and from below (not shown), where the viewing angle is centered on or near object 193 or any other object selected by the player. The point of view of camera 173/175/215 may move around object 193 so that LCD 22 or LCD 33 displays object 193 from many different points of view and directions in the simulated three-dimensional world.

When a player selects a point of view 175 and a direction angle of view 177 for display on LCD 22 or LCD 33, the player may zoom-in on object 193 by manipulating a control member on a handheld control unit, so that the image of object 193 is enlarged. This enables a player to examine object 193 in greater detail on LCD 22 or LCD 33. The player may also zoom-out by manipulating the same control member which causes the picture on LCD 33 to cover a broader viewing angle 222 and field of view.

Figure 22:
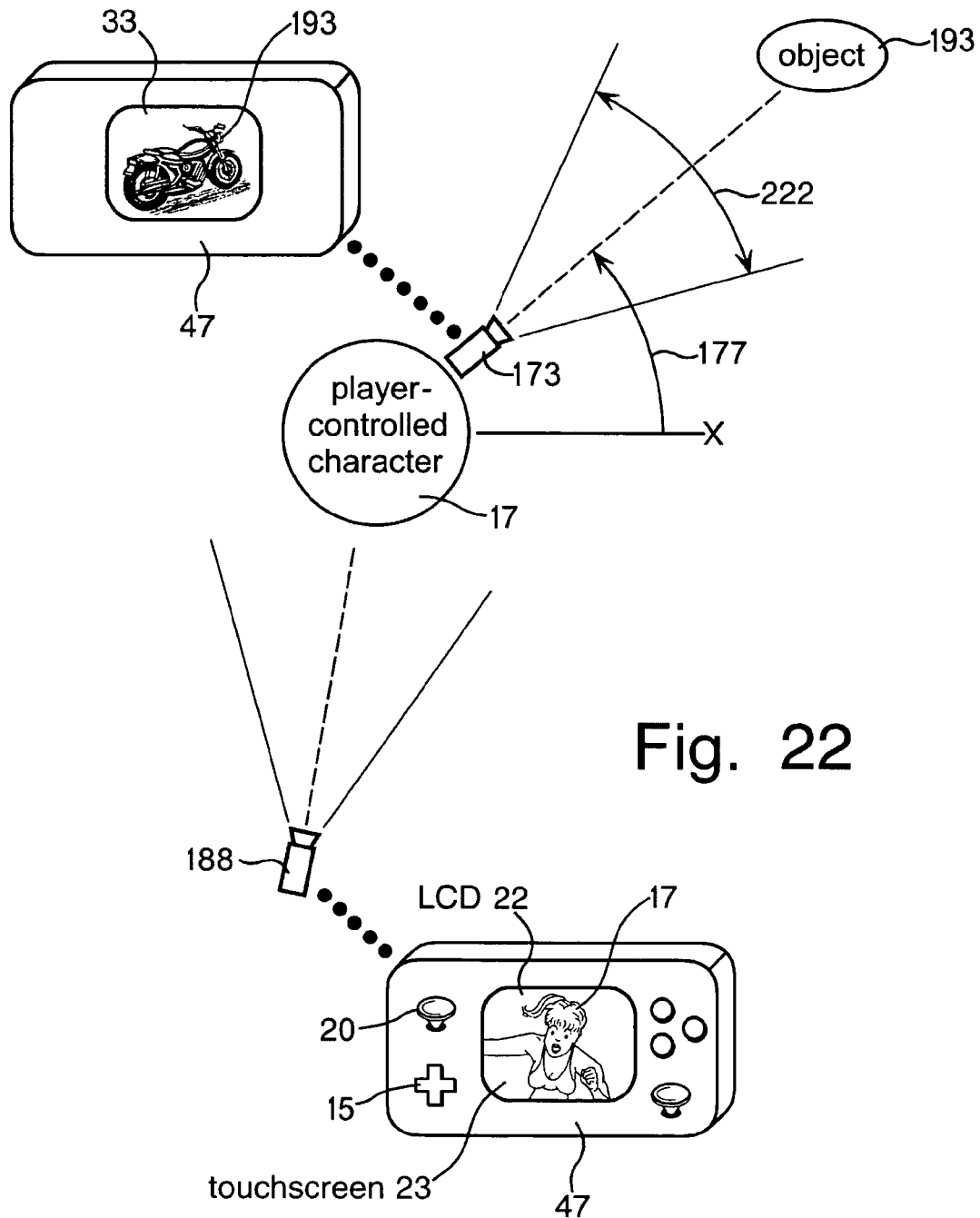
FIG. 22 illustrates display of objects simultaneously on two LCD devices from variable angles around an object.

FIG. 22 illustrates a game in which player-controlled character 17 is displayed on LCD 22 in portable game system 47, as described above with reference to FIG. 21, and is viewed (indicated by the short line of dots) from the point of view of "camera" 188. From the subjective point of view of character 17, object 193 is initially viewed from a second "camera" 173 on LCD 33. The angle 177 at which objects are viewed by camera 173 is variable and may be manually controlled by the player to direct camera 173 at various angles to search for other objects that may provide alternative means of escape or other important objects. The picture generated from the perspective of camera 173 appears on LCD screen 33 in portable game system 47. The relationships between the two cameras and the two display screens are indicated by lines of dots in FIG. 22.

Camera 173 may also zoom in or zoom out on object 193 so that object 193 appears larger or smaller on LCD 33. Object 193, which in this example is motorcycle 193, may be displayed on LCD 33 (indicated by the long line of dots) or on LCD 22.

Generating a picture from the perspective of a player-controlled character is referred to as the "subjective mode" in U.S. Pat. No. 6,139,433, column 36, in which all camera modes display pictures on a common TV screen for all players in the room to see.

In FIG. 22, the player can relocate the point of view from camera 173 to another camera at the point of view of a newly selected object represented in FIG. 22 as object 193. The player relocates the point of view by pointing to object 193 on touchscreen 23, or pressing a combination of buttons or other manipulatable device on portable game system 47 or control unit 185. When the player relocates the point of view from character 17 to object 193, the picture displayed on LCD 22 in portable game system 47 will be from the point of view of object 193, which in this example may be another player-controlled character such as a motorcycle that is player controlled by touchscreen 23 or joystick 20 or 21 in portable game system 47. A player can relocate the point of view multiple times through a chain of player-controlled characters and other objects using this method.

Figure 23:
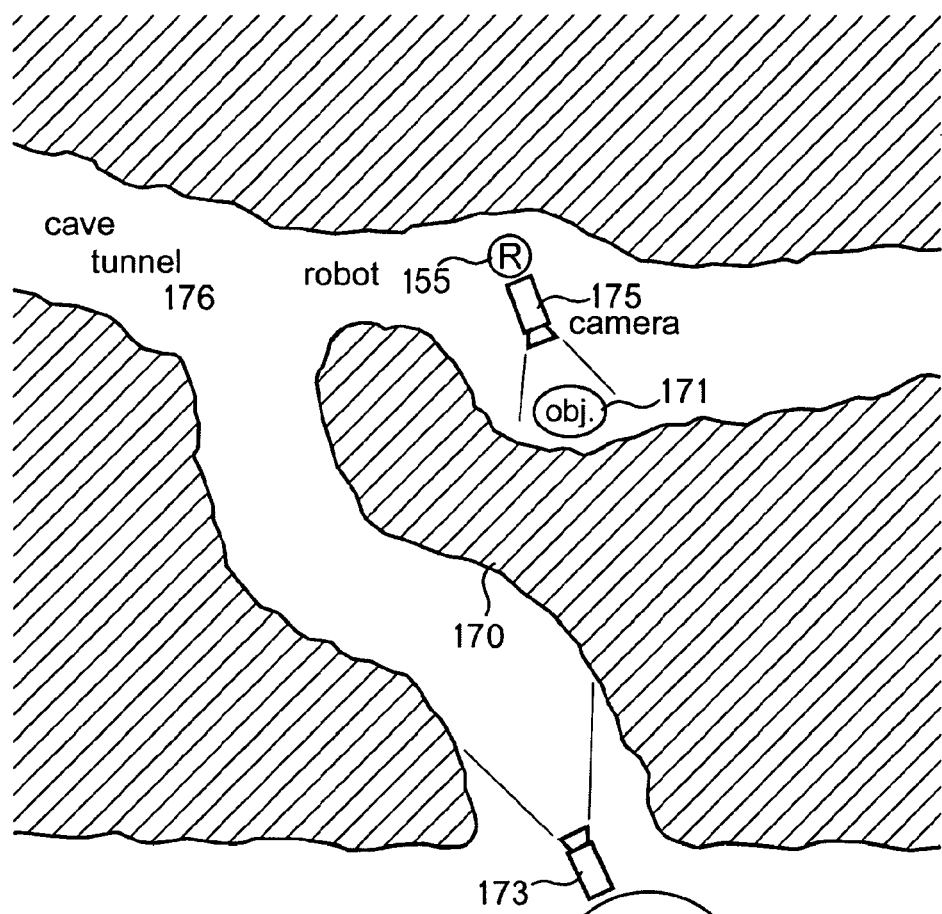
FIG. 23 is a cross-sectional view of a cave tunnel in which a robot camera is focused on a hidden object that is not observable from an external point of view.

FIG. 23 illustrates a game in which two player-controlled characters (animated character 17 and robot character 155) are controlled by the same human player, although in some embodiments not all functions of both characters can be controlled simultaneously. If more than one player is playing this game, each player can control one of the characters. In the FIG. 23 example, animated player-controlled character 17 is standing at the entrance to a cave tunnel 176 shown in cross-section with walls 170. From the point of view of character 17, object 172 is displayed on LCD 22 when her "camera" 173 is pointed at angle 177. When her camera 173 is pointed toward the entrance to cave 176, character 17 cannot see deep into the cave and her body is too large to crawl into the cave.

To explore the cave, a human player may activate a small character such as a land-crawling robot 155 indicated by the circled R in FIG. 23, with images of object 171 displayed on LCD screen 33 (as shown in FIG. 22) from the robot's point of view camera 175. The player controls movements, directions, and point-of-view perspectives of robot camera 175 like any other player-controlled character using touchscreen 23 or control members 15 or 20 in portable game system 47.

In the FIG. 23 example, character 17 is displayed on LCD screen 22 in portable game system 47 (as in FIG. 22) as standing at the entrance to cave 176, while robot 155 explores the cave. The point of view of robot 155 is from camera 175 which may be controlled by the same player as camera 173. Camera 175 is pointed at object 171 which may be hidden treasure in this example that is accessible only by a small robot. The player then has a problem of removing the treasure from cave 176 using remote controlled grippers (not shown) on robot 155, that are controlled by the human player.

In FIG. 23, when a player selects a point of view 175 and a direction of view for display on LCD 22 or LCD 33, the player may zoom-in on object 171 by manipulating a control member on a handheld control unit, so that the image of object 171 is enlarged to enable a player to examine object 171 in greater detail. The player may also zoom-out by manipulating the same control member which causes the picture on LCD 22 to cover a broader field of view in FIG. 23.

The point of view of robot 155, during the cave-exploring task, is represented in FIG. 23 as camera 175 which is the point of view from which object 171 is generated for display on LCD screen 22 on portable game system 47.

Figure 23A:
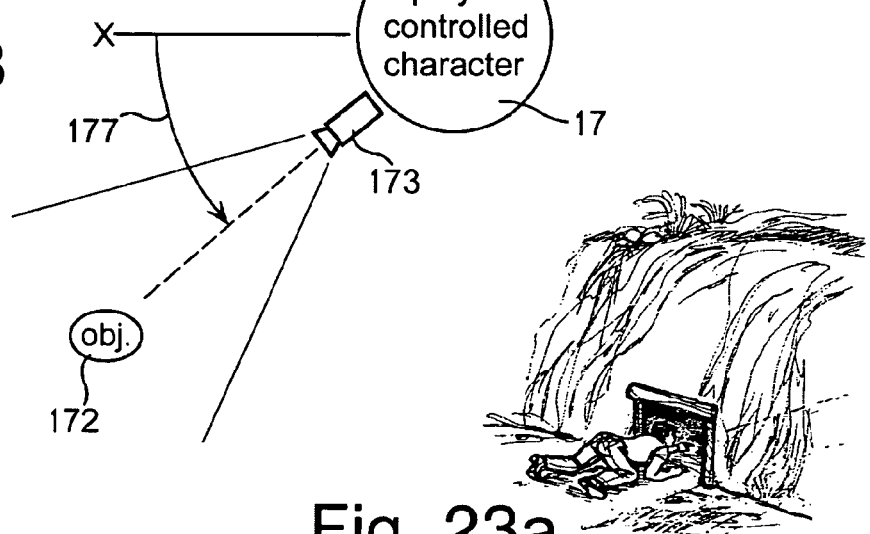
FIG. 23a illustrates a player-controlled character entering a cave tunnel.

FIG. 23a illustrates a player character entering cave tunnel 176 as shown in FIG. 23.

Figure 24:
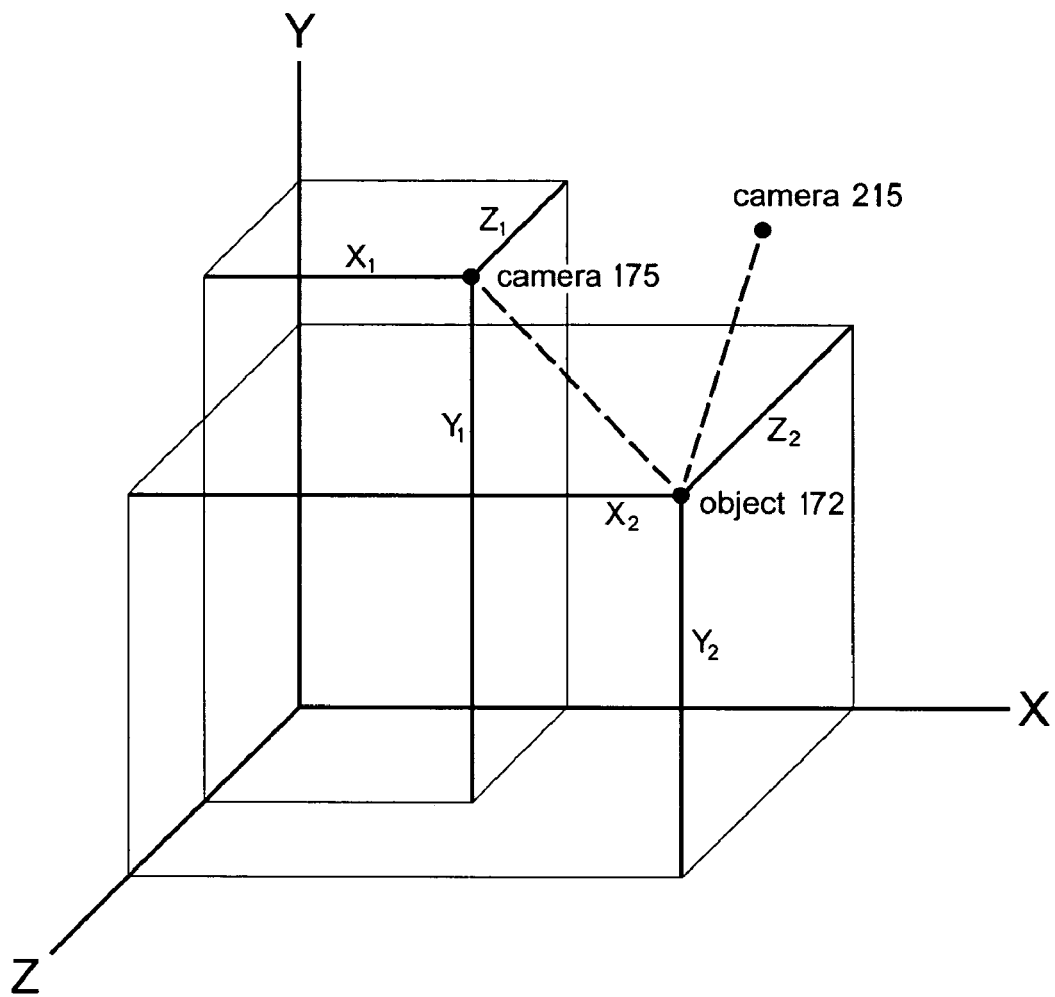
FIG. 24 is a three dimensional (x,y,z) graph illustrating Cartesian coordinates of multiple viewpoint cameras and an object being viewed.

FIG. 24 is a three dimensional graph illustrating Cartesian coordinates ($X_1$ $Y_1$ $Z_1$) of an exemplary camera 175 and coordinates ($X_2$ $Y_2$ $Z_2$) of an exemplary object 172 being viewed by the simulated camera. See examples in FIGS. 22 and 24. Polar coordinates would also be an appropriate equivalent. For clarity, coordinates are not shown for camera 215 which may be the same as camera 175 but at different locations in the generated three dimensional world.

Figure 25:
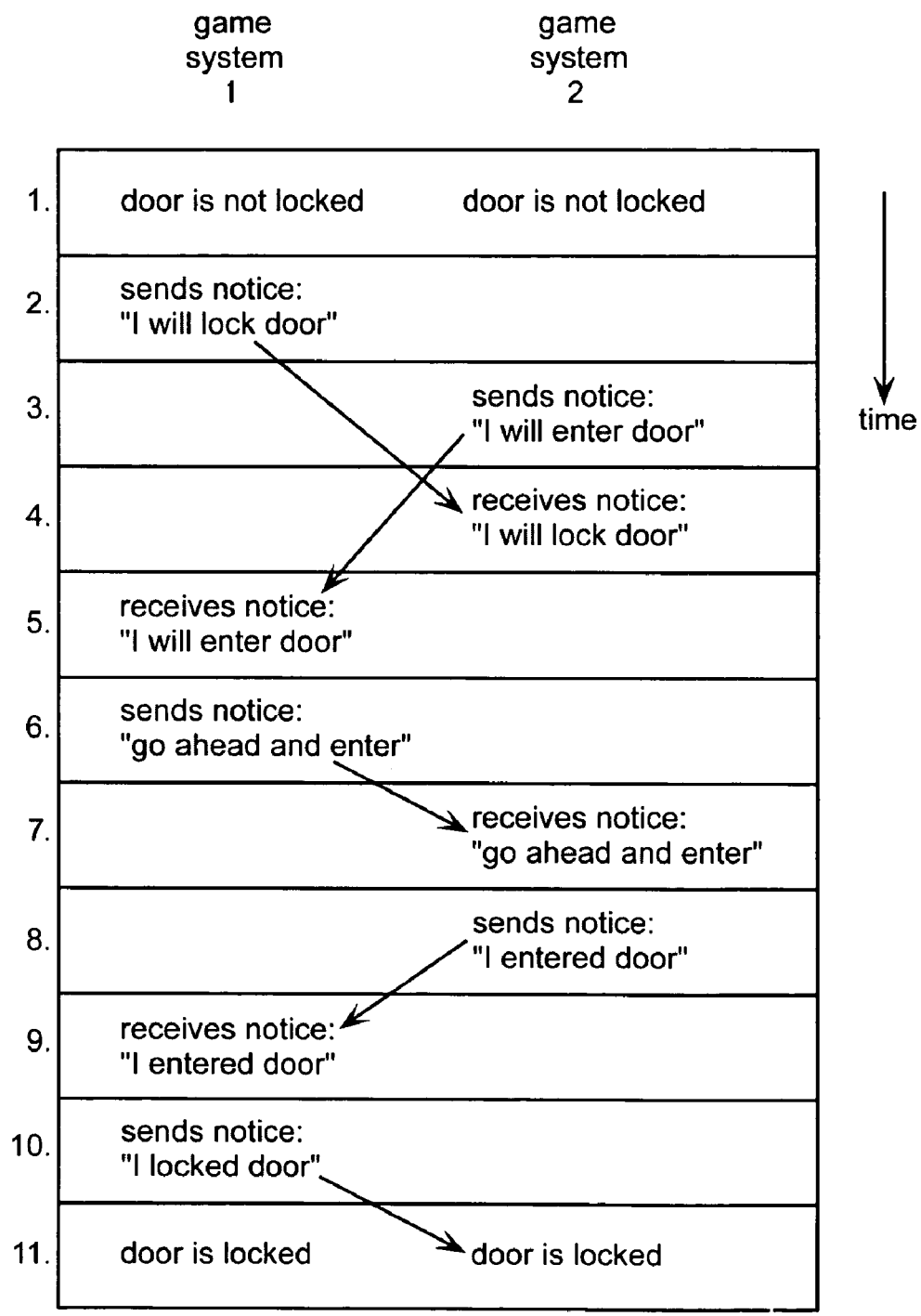
FIG. 25 is a time sequence example of two game systems using semaphores to synchronize the game systems during delays in message transmission.

FIG. 25 illustrates a time sequence, from top to bottom, of processing by two cooperating game systems 42: system (1) in the left column and system (2) in the right column. Because of variable delays in transmission of packets through the Internet, some status data records 78 may be delayed more than others and some records may arrive out of sequence. This could cause an unintentional reversal of recent status data being replaced with older data. To prevent this problem, semaphores are used as illustrated in FIG. 25. A semaphore in this context is data sent from a first system to a second system that suspends further processing of the data in the second system until further data is received from the first system.

In the FIG. 25 example, a first character controlled by system 1 is about to lock a door, but a second character controlled by system 2 is about to enter the same door. If the two characters arrive at the door at about the same time, one system may record the second character status as having entered, while the other system may record the second character status as having been blocked by the locked door. Later, if the second character is reported as beyond the door, the inconsistency in status can be automatically corrected. But it is better to avert this problem, because two player may be watching their first and second characters approach the door and should not be misled by false imagery. Whether the second character enters or is blocked, the status of the second character should be the same in all systems in a session.

In FIG. 25 at time 1, both systems agree on the "door is not locked" status. At time 2 system 1 sends a status record that notifies other systems of the intention to lock the door. At time 3 system 2 sends a status record that notifies other systems of the intention to enter the door. The two notices cross in cyberspace. At time 4 system 2 receives the lock notice record, but must disregard it until system 1 responds to the entry notice. At time 5 system 1 receives the entry notice. At time 6 system 1 sends a "go ahead" notice. At time 7 system 2 receives the "go ahead" notice. System 2 then updates the status of the second character as having passed through the door and updates the character's location as beyond the door. At time 8 system 2 sends this location change that confirms that the second character has passed through the door. At time 9 system 1 receives the location change record and updates the location status of the second character. At time 10 system 1 updates the status of the door as locked and sends a "door locked" notice. At time 11 system 2 receives the "door locked" notice and updates the door status as locked. At time 11, both systems agree on the status of the locked door and the location of the second character.

To avoid a deadlock (actually livelock because it can be interrupted) situation in which each system is waiting for the other system to do something and thereby blocks further progress in the game in all systems, perhaps because one of the semaphore records failed to arrive or because of a bug in a program, there should be a time limit of about two seconds on semaphore records. After the time limit has passed, the location data should force a status change in all systems in a session so that the game can proceed.

If the above description of FIG. 25 seems like unnecessary complexity, remember that the goal is to allow all players to display what all characters are doing and to accurately display the results of their prior actions without transmitting huge amounts of video data over the Internet. Transmitting video would not look real because of transmission delays and would not solve the problem of status updating.

Figure 26:
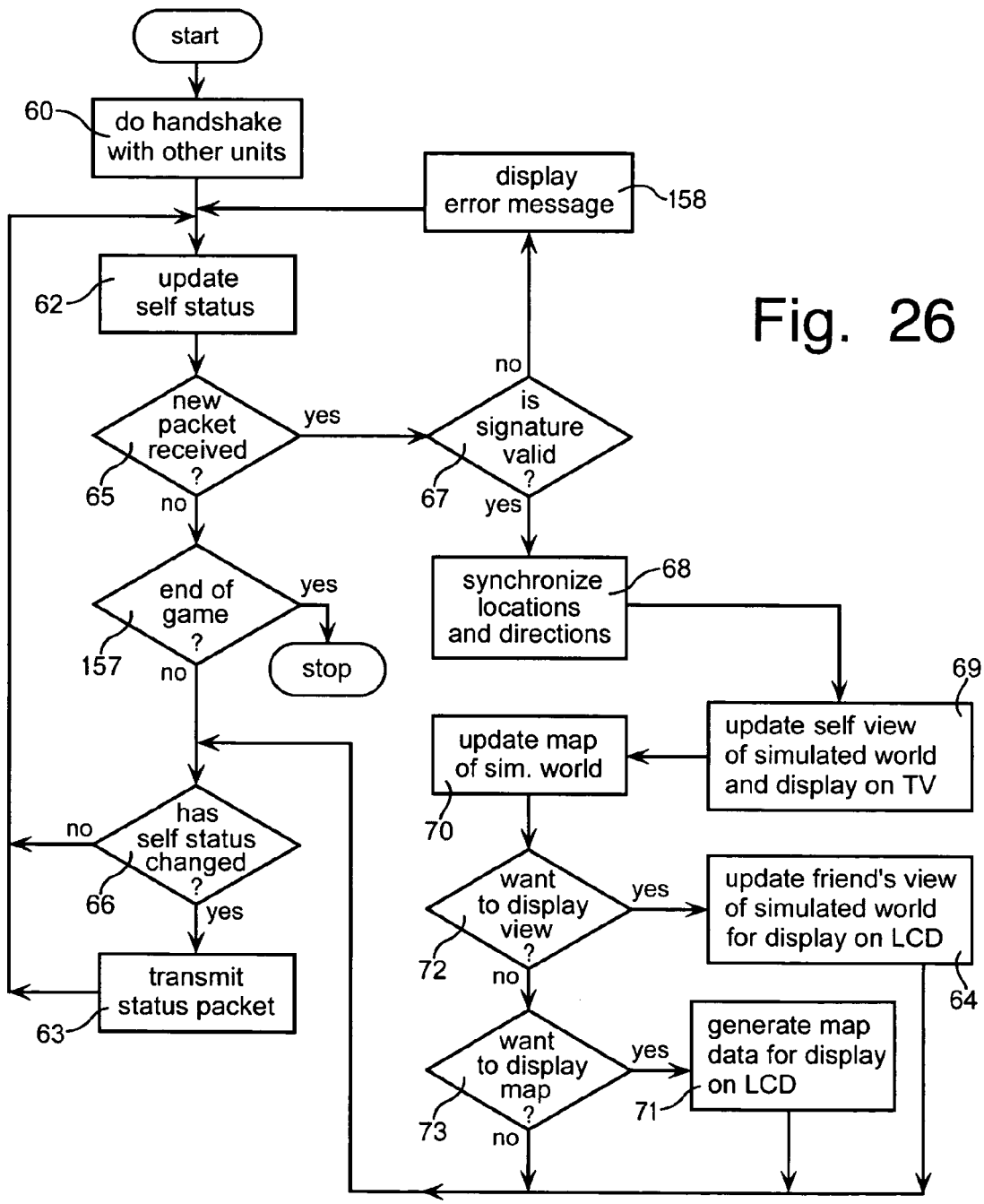
FIG. 26 is a flowchart illustrating synchronizing processes performed by two or more interacting game systems.

FIG. 26 is a flowchart that illustrates examples of some of the processing performed by CPU processor 86 in each video game system 42. When a data connection is established through the Internet or other network between two or more video game systems 42, process 60 in each system 42 sends a record similar to records 78 in FIG. 27 to messaging server 120 to identify the player and the player character or object to be controlled by that player. Server 120 then sends a data record to each video game system 42 that identified the session number and game id and a common time/date to eliminate any time zone and clock synchronization problems. Each video game system 42 sends confirmation data records back to the server which checks that all systems are synchronized.

After conflicts are corrected and this handshake process 60 is completed, process 60 initializes a "self status" table of data that specifies the initial spatial coordinates and orientation of each player character, and other initial data. Process 60 sends this initial data as status data records 78 to other systems.

Process 62 then updates this self status table if a player has moved his character.

Process 65 then checks for any incoming status data records. If a packet of status data has been received, process 67 checks the packet for invalid session id numbers, player id numbers, impossibly large movements of objects, and other signs of invalidity.

If no invalid data is found by process 67, process 68 processes the incoming status data records and updates the 3-D variables representing player character motion and other changes in status indicated by the incoming data. Process 68 also checks the time stamp and message serial number to detect delayed data, to resolve conditions where one data record is received before a second record but with a later time stamp, and to resynchronize elapsed time with other systems.

Process 69 then updates the self view of the simulated 3-D world and updates the image data from which a video signal is generated for display on the television screen. One example of a change in status that can greatly affect the displayed image of the self player character is if another character has collided with the self character. The self video game system 42 discovers that such a collision has occurred by receiving a status data record from the system 42 that moved the colliding character into or near the coordinates of the self player character.

After the 3-D data for the simulated game world has been updated by process 69, process 70 updates a 2-D map of the simulated world and transmits the map in a compressed form that can be transmitted quickly to portable game systems 44 and 47 for display on LCD 22.

Process 72 checks for requests for an LCD display of another player's view of the simulated world and generates data records containing the coordinates and orientation of all moving objects that can be viewed from the requested point of view and viewing angle. These generated data records are then transmitted through link 45 (FIG. 8) to portable game system 44 or 47 so that processor 50 and coprocessor process 301 can generate the requested image on LCD 22 or 33. Alternatively, process 64 may generate and transmit data for all moving objects to portable game system 44 or 47 at infrequent intervals whether requested or not.

Process 73 checks for requests for an LCD display of a map of a selected area of the simulated game world and if requested, process 71 then generates map data records containing the coordinates and orientation of all moving objects that are represented within the selected map area. Process 71 then transmits these generated map data records through link 45 (FIG. 8) to portable game system 44 or 47 so that processor 50 and coprocessor process 301 can generate the requested map on LCD 22 or 33. Alternatively, process 71 may generate and transmit data for all moving objects to portable game system 44 or 47 at infrequent intervals whether requested or not.

Process 66 determines if the self status has changed, either because of the self player manually caused generation of control data that affected the self status or because an incoming status data record indicated that another character or object caused a change in self status. If process 66 determines that self status has changed, process 63 generates an outgoing status data record and transmits it to messaging server 120 to be shared with other video game systems 42.

FIG. 27 illustrates record formats of exemplary data records 78 used for communication between processor 50 in portable game system 44 or 47 and microprocessor 86 in console 42 by way of data links 153 and 154 (FIG. 11), or between two console game systems 42 (FIG. 8), or between two portable game systems 44 and 47 (FIG. 12). Each record 78 consists of several data fields including a record format, a time stamp so that multiple records can be processed in sequence, a message serial number assigned by server 120 to avoid duplicates, and an object identifier to identify the character or other object for which the status is being updated. For computability, the record formats for console systems 42 and portable systems 47 should be the same format.

Figure 28:
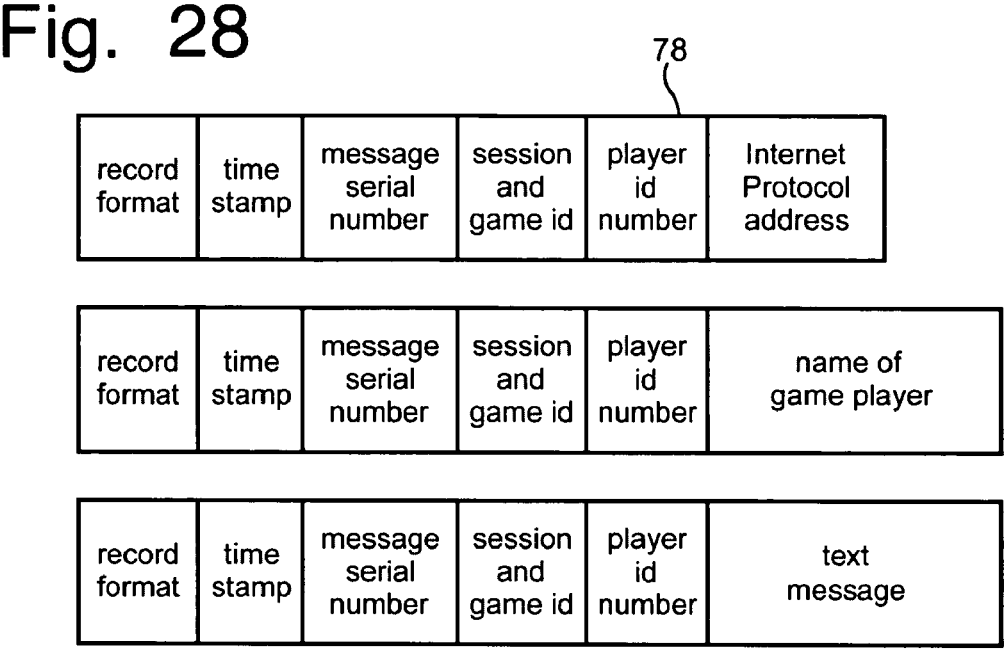
FIG. 28 are typical record formats of initializing records that may be transmitted to and received from interacting game systems.

FIG. 28 is a continuation of FIG. 27 for initializing data records that are sent to server 120 at the beginning of each session after the server generates a session number and player identification number in records sent from server 120 to each console game system 42 and portable game system 47 in a session.

Figure 28A:
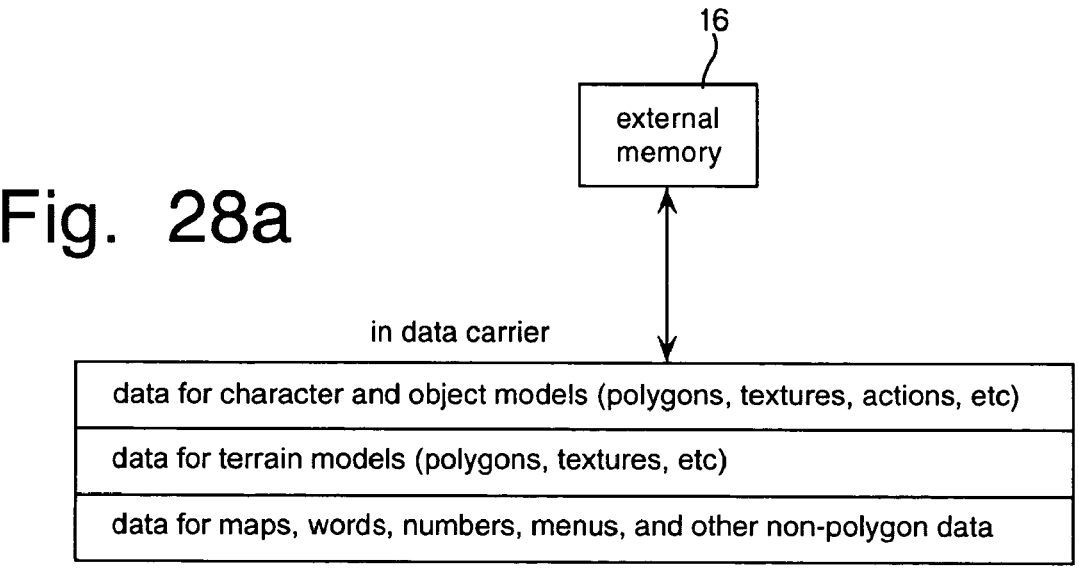
FIG. 28a is a typical memory map of various data stored in an external memory device.

FIG. 28*a* is memory map of game data in a data carrier such as an external semiconductor memory 16, manually removable disk 43, and/or network packets for use in portable game systems 44 and 47.

FIG. 29 is memory map of game programs and data in a data carrier such as an external semiconductor memory 16, manually removable disk 43, and/or network packets for use in console game systems 42.

FIG. 30 is a memory map of programs for performing functions described above with reference to FIG. 11, and data processed by those programs stored in RAM 53 in portable game system 47.

Figure 31:
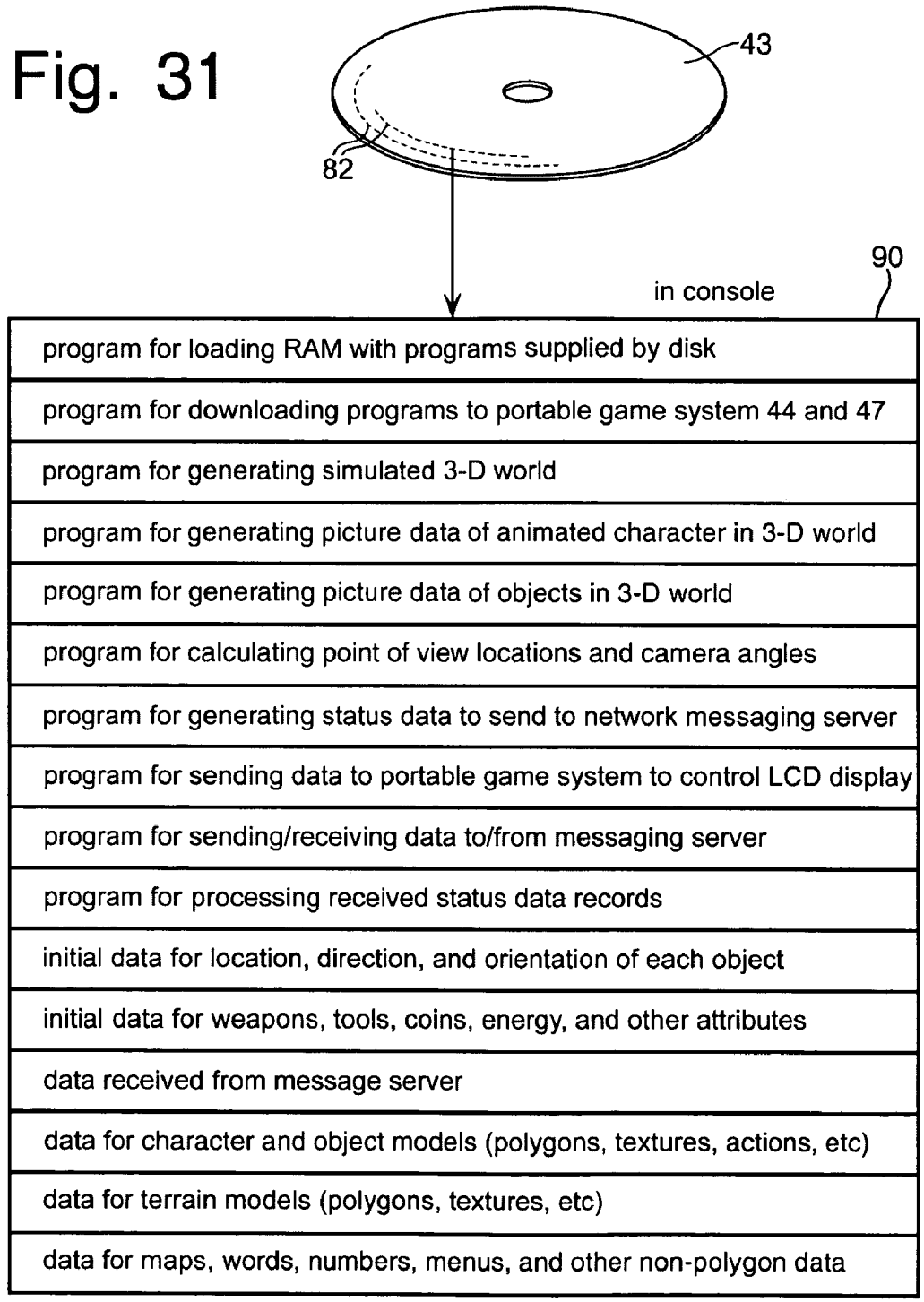
FIG. 31 is a typical memory map of programs and data stored in RAM 90 in each console game system.

FIG. 31 is a memory map of programs for performing functions described above with reference to FIG. 13, and data processed by those programs stored in RAM 90 in console game system 42.

FIG. 32 illustrates processes for generating 3-D objects in a 3-D game world for display on autostereoscopic LCD 34 in console game system 42 described above with reference to FIGS. 13 and 14. Stored in RAM 90 is data that represents a 3-D game world, model data defining 3-D characters and objects populating the 3-D game world, and program instructions for generating graphics commands and picture element (pixel) data. Additional data 78 may be received from another systems 42 or portable game system 44 or 47 that specify variables regarding objects, locations, viewing angles, etc.

Processor 86 may execute program instructions from RAM 90 to generate graphics commands for processing by graphics co-processor 316 (FIG. 13) to perform process 213 (FIG. 32) that generates picture element data rendered as texture mapped polygons representing a moving 3-D object 17 against 3-D background terrain generated from viewpoint 175 for the left eye. Viewpoints 175 and 215 are described below with reference to FIG. 34.

Likewise process 214 generates picture element data rendered as texture mapped polygons representing object 17 and background terrain generated from viewpoint 215 for the right eye.

This rendered picture data is stored in display RAM 302 as alternating columns of pixels: even numbered columns 74 of pixels for viewpoint 175 (left eye) and odd numbered columns 75 of pixels for viewpoint 215 (right eye).

The resulting array of interlaced pixel data 338 is stored in display RAM 302. LCD drivers 119 (FIG. 13) feed data for each pixel from display RAM 302 into the corresponding row and column of dot matrix LCD 34. LCD driver 119 or processor 86 also enables or disables parallax barrier 337 for a stereoscopic mode or non-stereoscopic mode.

Figure 33:
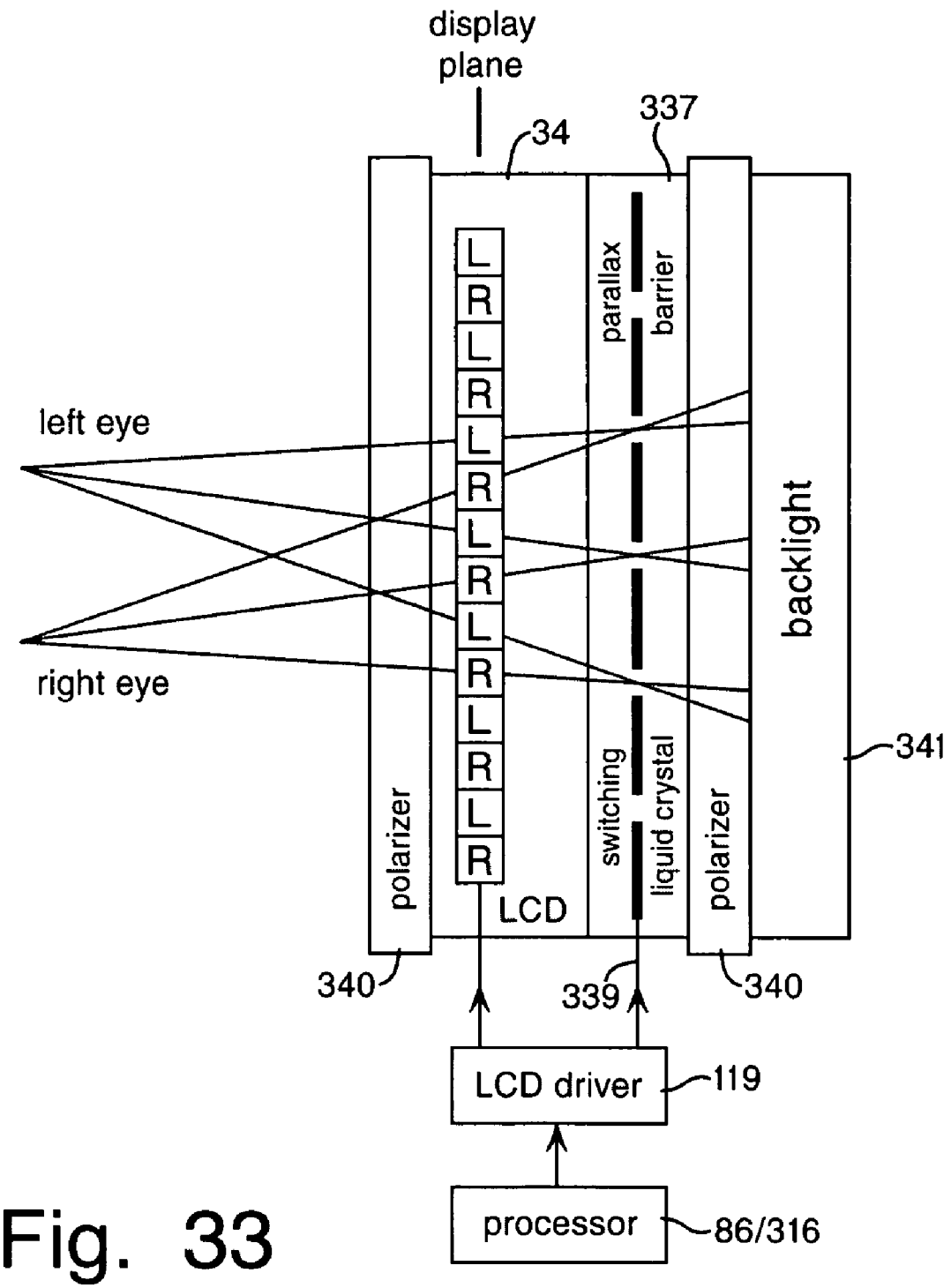
FIG. 33 is a cross-section view of an autostereoscopic LCD display device described in US patent application 2004/0012671.

FIG. 33 illustrates an exemplary cross-sectional view of an autostereoscopic LCD device 34 such as described above with reference to FIGS. 4, 6 and 7. The term "autostereoscopic" as used herein means providing parallax image information to both eyes, without requiring a viewing aid such as polarizing eyeglasses or head-mounted device such as time division shutters. Further details of autostereoscopic LCD devices may be found in US patent application 2004/0012671.

Autostereoscopic LCD device 34, illustrated in cross-section in FIG. 33, has an LCD display plane with alternating columns of pixels that provide interlaced image lines for the player's left eye and right eye. The LCD display plane is sandwiched between conventional input and output polarizers 340. A switchable parallax barrier 337 (a second LCD with transparent vertical slits) is also positioned, in this example, between the two polarizers 340. Backlight 341 provides transmitted illumination through the slits during stereoscopic use.

Processor 86 sends an electrical signal 339 (FIGS. 11 and 13) to parallax barrier 337 during stereoscopic use which blocks transmitted light through the parallax barrier, and hence through the display plane LCD, except for the transparent vertical slits that provide illumination through each left-right pair of pixel columns in the display plane. If signal 339 is not enabled, parallax barrier 337 is transparent so that LCD screen 33 may display images such as maps, words, numbers, symbols, graphs, cartoons, 2-D pictures, and non-stereoscopic 3-D pictures.

Figure 34:
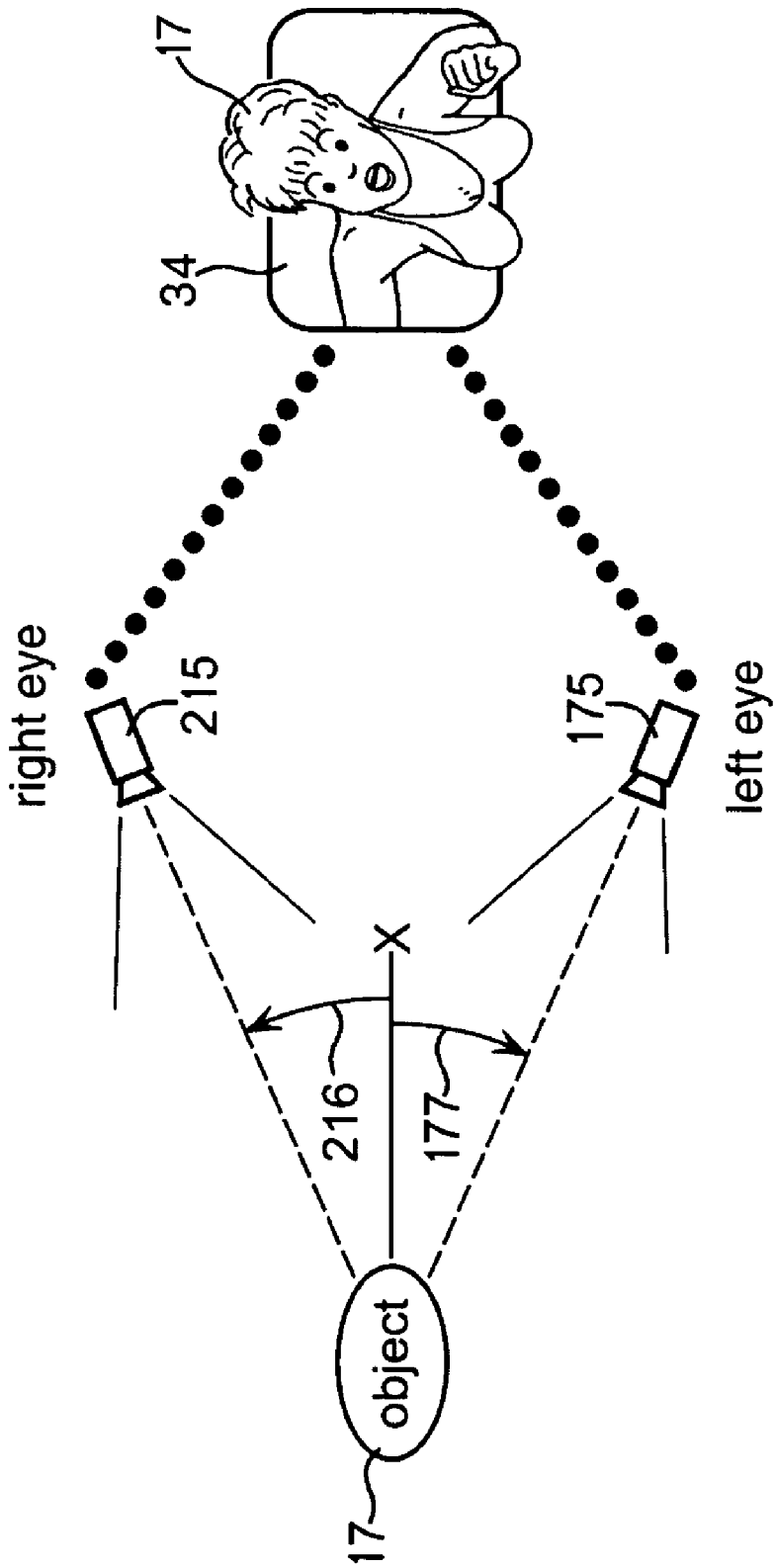
FIG. 34 illustrates views of a 3-D object generated from two different viewpoints and virtual angles for display on an autostereoscopic LCD.

FIG. 34 illustrates how a 3-D object 17 (a player character in this example) can be displayed on LCD screen 34 as a stereoscopic image using the same image generation processes described above with reference to FIG. 21. The two viewpoints or virtual "cameras" 175 and 215 that generate object 17 from different angles, may be used as two virtual "eyes" so that pictures displayed on LCD 34 are stereoscopic.

Figure 19A:
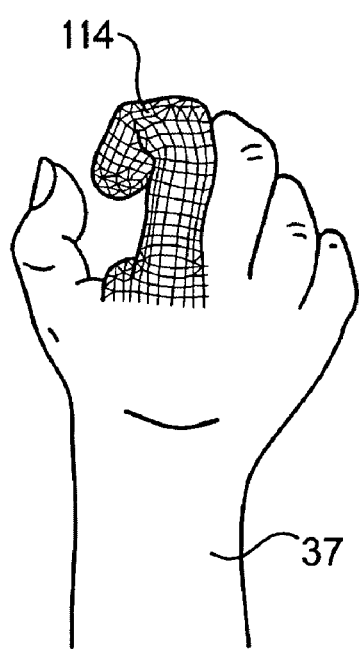
FIG. 19a illustrates a polygon model of a finger in the hand shown in FIG. 19.

As illustrated in FIGS. 34 and 19*a*, two pictures of object 17 are generated as textured polygons from two different viewpoints 175 and 215 for display on LCD 34 (indicated by the two lines of dots). By using a stereoscopic LCD 34 in console game system 42 such as described above with reference to FIGS. 32 and 33, and by sending textured polygon picture element data representing viewpoints 175 and 215 to alternating columns of pixels in the LCD display plane (FIG. 33), an autostereoscopic effect is produced as if viewed by a pair of cameras presenting a pair of stereoscopic images to a player's left eye and right eye.

As illustrated in FIG. 21, the directions from which object 17 is generated are variable and may be manually controlled by the player. When a pair of images are zoomed-in for a close-up image on LCD 34, angles 177 and 216 in FIG. 34 may be increased to reinforce an illusion that object 17 is closer to cameras 175 and 215. Cameras 175/215 may also zoom out and angles 177 and 216 be reduced so that object 17 appears more distant on LCD 34.

A human player controls movements, directions, zoom, and point-of-view perspectives of cameras 175 or 215 using a directional input control device, such as touchscreen 23, direction-switch 15, or joysticks 20 or 21 in portable game system 47 (FIG. 1), or in handheld controller 185 (FIG. 7), or similar control devices.

Object 17 may be viewed from any angle horizontally and in three dimensions from above and from below (not shown), where the viewing direction is centered on or near object 17 or any other object selected by the player. The viewpoint pair 175/215 may circle around object 17 while being directed toward object 17, so that LCD 34 displays object 17 from many different viewpoints and directions and camera angles in the simulated 3-D game world stereoscopically.

Generating interlaced stereoscopic pixel data for both eyes does not require two graphics processors, because one conventional graphics coprocessor can perform rendering process 301 twice for each frame from two viewpoints, and store the resulting left eye pixels 74 and right eye pixels 75 interlaced in odd and even columns 338 in display RAM 302. Alternatively, one section of RAM 302 may be dedicated to odd column pixel data for LCD 34 and a second section of RAM 302 may be dedicated to even pixel data for LCD 34. Graphics coprocessor 316 may be integrated with cpu processor 86.

Player-controlled characters may include characters that resemble humans, humanoid characters, animal characters, alien characters, mythical characters, imaginary characters, cartoon characters, and other types of characters. One player may control movement of a character on land and inside buildings, while another player may control movement of another character in tunnels and while the character is flying or swimming, as examples. One player may control a character walking and running and point-of-view selection, while another player may control the same character jumping and fighting and weapon selection, as examples.

Animated character means a character with body parts that can move with lifelike movement. Characters are a proper subset of objects. Geometric objects such as pyramids, spheres, triangles, and rectangles are not characters.

For simplicity, animated characters and other objects may be represented in the drawings as circles and other shaped figures which do not imply that they would be so represented on a display screen. Characters, objects, and situations in a game are not limited to those depicted herein for illustrative purposes.

The word "camera" as used herein is a metaphor and denotes a point of view or perspective from which a real camera would see the generated picture at a specified angle.

The term "processor" may include two or more cooperating processors and/or coprocessors. The term "program" as used herein may consist of more than one loadable module and includes executable instructions and any data and addresses that are typically part of a program module or modules.

The term "LCD" (liquid crystal display) has been used herein as an illustrative example of any discrete display device having discrete picture elements. Other discrete display technologies may be substituted for LCD technology. For example light emitting diode (LED), digital micromirror device (DMD), and plasma display technologies.

The expression "portable game system" is a term of art and means an electronic game system that has a built-in display panel, is battery powered, and may be held in a player's hands during use, although not necessarily being so held during use.

Various wireless data transmission methods may be used between game systems, such as RF, infrared, ultrasound, and equivalent wire cables as illustrated in FIG. 17, or other data communicating forms of energy.

Although I have described my invention with a degree of particularity in connection with what is presently considered to be the most practical and preferred embodiment, it is to be understood that the present disclosure has been made only by way of example and that my invention is not to be limited to the disclosed embodiment, but on the contrary, is intended to cover various modifications, arrangements, steps, and components included within the spirit and scope of the appended claims.

REFERENCE NUMBERS IN DRAWINGS 10 human player
11 television (TV) set or video monitor
12 human player
14 push button
15 cross-switch (directional pad)
16 external memory cartridge
17 player-controlled character
18 player-controlled character
19 video game system generally
20 joystick assembly
21 joystick assembly
22 LCD screen
23 touch screen
24 touch pad
27 speaker
33 LCD screen
34 autostereoscopic LCD screen
35 picture of iron pipe
37 picture of player character's hand
38 infrared communication unit
40 electrical connector
41 cable linking game console to TV
42 console game system
43 optical disk
44 portable game system
45 data link between game units
47 portable game system
50 cpu processor in portable game system
51 touchpad and/or touchscreen processor
52 memory security processor in portable
53 random access memory (RAM) in portable
56 TV screen
57 push-button
60 program process
62 program process
63 program process
64 program process
65 program decision 66 program decision
67 program decision
68 program process
69 program process
70 program process
71 program process
72 program decision
73 program decision
74 left eye display area
75 right eye display area
76 read only memory (ROM) in portable
78 data record
80 burst cutting area (BCA) of disk
81 program and data area of disk
82 tracks molded into disk
83 optical disk reader
84 security processor in console
86 cpu processor in console
87 electrical connector
88 peripheral interface processor
89 EPROM or EEPROM
90 RAM in console
91 boot ROM in console
92 address bus in console
93 data bus in console
114 polygon
117 video signal generator
119 LCD driver circuit
120 instant data message server
121 Internet
126 crypto processor
146 animated picture (pixel) data
146a animated picture (pixel) data
151 console program in RAM 90
152 portable program in RAM 90
153 data transmission
154 data transmission
155 land-crawling robot
157 program decision
158 program process
170 cave wall
171 generic object
172 generic object
173 point of view "camera"
175 point of view "camera"
176 cave, tunnel, or maze
177 "camera" angle
184 portable game system
185 control unit with joystick
186 data link between game units
187 table or other support
188 point of view "camera"
191 portable game system
192 control unit with joystick
193 picture of motorcycle
197 vertical assembly
198 hinge assembly
199 base assembly
213 program process
214 program process
215 point of view "camera"
216 "camera" angle
222 field of view angle
249 RF wireless data link
250 RF transceiver (Wi-Fi)
251 RF transceiver (Wi-Fi)
301 process of polygon rendering
301a process of polygon rendering
302 display RAM (stereo pixel data)
316 graphics co-processor
317 data bus in console
325 harddisk drive or writable ROM
331 speaker in console
333 network interface
334 microphone
337 parallax barrier
338 interlaced stereoscopic pixel data
339 parallax barrier enable signal
340 polarizer
341 backlight
342 Lenticular screen lenses
343 slits in parallax barrier

The invention claimed is:

1. A method for use in a multi-player game system having a first game apparatus operated by a first player and a second separately housed game apparatus operated by a second player, the method comprising the steps of:
   (a) generating in said first and second game apparatus polygon vertex data that represent shapes of a 3-dimensional first player-controlled simulated object controlled by said first player and moving toward a simulated walled volume of space in a simulated 3-dimensional game world;
   (b) rendering said polygon vertex data in said first and second game apparatus to generate pixel data that represents said first player-controlled object from variable viewpoints for display on first and second display devices;
   (c) receiving first status data through a data transmission link from said second game apparatus that notifies said first game apparatus that said walled volume of space is occupied by a second player-controlled object controlled by said second player;
   (d) inhibiting generation of polygon vertex data in said first and second game apparatus that represents shapes of said first player-controlled object entering said walled volume of space whenever said walled volume of space is occupied by said second player-controlled object;
   (e) receiving second status data from said second game apparatus that notifies said first game apparatus that said walled volume of space is unoccupied by said second player-controlled object and available for entry by said first player-controlled object;
   (f) generating pixel data in said first game apparatus that represents said first player-controlled object entering said walled volume of space after said first game apparatus has determined from said second status data that said walled volume of space is unoccupied by said second player-controlled object; and
   (g) initiating transmission of third status data from said first game apparatus to notify said second game apparatus that said first player-controlled object has entered said simulated walled volume of space.

2. The method of claim 1, wherein said simulated walled volume of space comprises any from the group consisting of: room, cave, hallway, tunnel, other walled volume of space, and a combination thereof.

3. The method of claim 1, wherein said data transmission link comprises any from the group consisting of: Internet, network server, wireless transmission, wired transmission, video game system, computer, and a combination thereof.

4. The method of claim 1, wherein said data transmission link comprises transmission through an Internet server that also provides instant messaging for communication of messages between registered players.

5. The method of claim 1, wherein at least one of said display devices is an LCD device.

6. The method of claim 1, further comprising the step of generating control data in a touchscreen on a portable game system to control movements of said first player-controlled object.

7. The method of claim 1, further comprising the step of generating control data in a touchscreen on a portable game system to control access to said walled volume of space.

8. The method of claim 1, wherein said rendering step renders said polygon vertex data to generate pixels as left and right images from two separate 3-dimensional points of view for display on an autostereoscopic display device having a parallax barrier for optically separating said left and right images for stereoscopic viewing.

9. The method of claim 1, wherein said first game apparatus is a portable game system that comprises at least one touchscreen.

10. The method of claim 1, further comprising the step of transmitting game data from said first game apparatus to a portable game system to display a portion of said 3-dimensional world from a 3-dimensional viewpoint in said simulated game world.

11. The method of claim 1, wherein said first game apparatus is a portable game system that comprises a disk drive for reading a digitally coded optical disk that stores at least one computer readable program that causes a processor in said first game apparatus to perform pre-determined process steps.

12. The method of claim 1, wherein said first game apparatus is a portable game system that comprises a disk drive for reading a digitally coded optical disk that stores a stereoscopic motion picture and comprises an autostereoscopic display device having a parallax barrier for optically separating left and right images in said motion picture for stereoscopic viewing.

13. A computer readable data storage medium for use with a multi-player game system having a first game apparatus operated by a first player and a second game apparatus operated by a second player, said data storage medium storing game program instructions comprising:

(a) executable instructions that cause said first and second game apparatus to generate polygon vertex data that represent shapes of a 3-dimensional first player-controlled simulated object controlled by said first player and moving toward a simulated walled volume of space in a simulated 3-dimensional game world;

(b) executable instructions that cause said first and second game apparatus to render said polygon vertex data to generate pixel data that represents said first player-controlled object from variable viewpoints for display on first and second display devices;

(c) executable instructions that cause said first game apparatus to receive first status data through a data transmission link from said second game apparatus that notifies said first game apparatus that said walled volume of space is occupied by a second player-controlled object controlled by said second player;

(d) executable instructions that cause said first game apparatus to inhibit generation of polygon vertex data in said first and second game apparatus that represents shapes of said first player-controlled object entering said walled volume of space whenever said walled volume of space is occupied by said second player-controlled object;

(e) executable instructions that cause said first game apparatus to receive second status data from said second game apparatus that notifies said first game apparatus that said walled volume of space is unoccupied by said second player-controlled object and available for entry by said first player-controlled object;

(f) executable instructions that cause said first game apparatus to generate pixel data that represents said first player-controlled object entering said walled volume of space after said first game apparatus has determined from said second status data that said walled volume of space is unoccupied by said second player-controlled object; and (g) executable instructions that cause said first game apparatus to initiate transmission of third status data to notify said second game apparatus that said first player-controlled object has entered said simulated walled volume of space.

14. The data storage medium of claim 13, wherein said simulated walled volume of space comprises any from the group consisting of: room, cave, hallway, tunnel, other walled volume, and a combination thereof.

15. The data storage medium of claim 13, wherein said data storage medium comprises any from the group consisting of: optically coded medium, semiconductor memory, magnetic data storage medium, and a combination thereof.

16. The data storage medium of claim 13, wherein said first game apparatus comprises any from the group consisting of: video game system, handheld game system, computer, stereoscopic disk player, and a combination thereof.

17. The data storage medium of claim 13, wherein said data transmission link comprises any from the group consisting of: Internet, network server, wireless transmission, wired transmission, video game system, computer, and a combination thereof.

18. The data storage medium of claim 13, wherein said data storage medium is a writable data memory into which said game program instructions are downloaded from a separately housed system.

19. A computer readable data storage medium for use with a multi-player game system having a first game apparatus operated by a first player and a second game apparatus operated by a second player, said data storage medium storing game program instructions comprising:

(a) executable instructions that cause said first and second game apparatus to generate polygon vertex data that represent shapes of a 3-dimensional first player-controlled simulated object controlled by said first player and moving toward a simulated enclosed volume of space in a simulated 3-dimensional game world;

(b) executable instructions that cause said first and second game apparatus to render said polygon vertex data to generate pixel data that represents said first player-controlled object from variable viewpoints for display on first and second display devices;

(c) executable instructions that cause said first game apparatus to receive first status data through a data transmission link from said second game apparatus that notifies said first game apparatus that said enclosed volume of space contains a second player-controlled object controlled by said second player;

(d) executable instructions that cause said first game apparatus to inhibit generation of polygon vertex data that represent shapes of said first player-controlled object entering said enclosed volume of space whenever said enclosed volume of space contains said second player-controlled object;

(e) executable instructions that cause said first game apparatus to receive second status data from said second game apparatus that notifies said first game apparatus that said enclosed volume of space does not contain said second player-controlled object and is available for said first player-controlled object;

(f) executable instructions that cause said first game apparatus to generate pixel data that represents said first player-controlled object entering said enclosed volume of space after said first game apparatus has determined from said second status data that said enclosed volume of space does not contain said second player-controlled object; and (g) executable instructions that cause said first game apparatus to initiate transmission of third status data to notify said second game apparatus that said first player-controlled object has entered said simulated enclosed volume of space.

20. The data storage medium of claim 19, wherein said simulated enclosed volume of space comprises any from the group consisting of: room, cave, hallway, tunnel, volume of space having walled sides, and a combination thereof.

* * * * *